United States Patent
Fujiwara

(10) Patent No.: US 10,939,030 B2
(45) Date of Patent: Mar. 2, 2021

(54) VIDEO AUDIO PROCESSING SYSTEM AND METHOD OF CONTROLLING THE VIDEO AUDIO PROCESSING SYSTEM

(71) Applicant: CANON KABUSHIKI KAISHA, Tokyo (JP)

(72) Inventor: Yuya Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/552,268

(22) Filed: Aug. 27, 2019

(65) Prior Publication Data
US 2020/0084366 A1    Mar. 12, 2020

(30) Foreign Application Priority Data

Sep. 7, 2018    (JP) .............................. JP2018-167783
Sep. 7, 2018    (JP) .............................. JP2018-167901

(51) Int. Cl.
*H04N 5/232*    (2006.01)
*H04R 1/32*    (2006.01)
*H04N 7/18*    (2006.01)

(52) U.S. Cl.
CPC ......... *H04N 5/23206* (2013.01); *H04N 7/181* (2013.01); *H04R 1/326* (2013.01)

(58) Field of Classification Search
CPC .... H04N 5/23206; H04N 7/181; H04R 1/326; H04R 2430/20; H04R 3/005
See application file for complete search history.

(56) References Cited

U.S. PATENT DOCUMENTS

| | | | |
|---|---|---|---|
| 9,716,946 B2* | 7/2017 | Goshen | H04R 5/027 |
| 2001/0024233 A1* | 9/2001 | Urisaka | H04N 5/232 348/211.6 |
| 2012/0076316 A1* | 3/2012 | Zhu | G01S 3/801 381/71.11 |
| 2015/0023524 A1* | 1/2015 | Shigenaga | H04R 1/326 381/92 |
| 2015/0350621 A1* | 12/2015 | Sawa | H04N 21/23412 386/201 |
| 2016/0043699 A1* | 2/2016 | Sawa | H04R 3/005 381/57 |
| 2016/0234593 A1* | 8/2016 | Matsumoto | G01S 5/20 |
| 2017/0019744 A1* | 1/2017 | Matsumoto | G06K 9/209 |
| 2017/0264999 A1* | 9/2017 | Fukuda | H04N 5/2252 |
| 2017/0300990 A1* | 10/2017 | Tanaka | G10L 17/005 |
| 2017/0353788 A1* | 12/2017 | Tatematsu | G06F 3/04883 |
| 2018/0165828 A1* | 6/2018 | Sasatani | G06T 7/70 |

FOREIGN PATENT DOCUMENTS

JP          2008193196 A          8/2008

* cited by examiner

*Primary Examiner* — Francis Geroleo
(74) *Attorney, Agent, or Firm* — Venable LLP

(57) ABSTRACT

A video audio processing system includes: a holding unit that holds a table for associating IP addresses of network cameras out of a plurality of network cameras with an IP address of at least one of communication devices; and an associating unit that generates a file by associating, in a case where video transmitted from one of the plurality of network cameras is obtained, video data transmitted from the network camera with audio data transmitted from a microphone having an IP address corresponding to the IP address transmitted from the network camera, the video data and audio data being associated with each other with reference to the table.

7 Claims, 18 Drawing Sheets

| Θ[deg] | L[mm] | T[μs] | DIFFERENCE OF T |
|---|---|---|---|
| 0 | 50 | 144 | |
| 15 | 48 | 139 | 5μs |
| 30 | 43 | 125 | 14μs |
| 45 | 35 | 102 | 23μs |
| 60 | 25 | 72 | 30μs |
| 75 | 13 | 37 | 35μs |
| 90 | 0 | 0 | 37μs |
| 105 | -13 | -37 | 37μs |
| 120 | -25 | -72 | 35μs |
| 135 | -35 | -102 | 30μs |
| 150 | -43 | -125 | 23μs |
| 165 | -48 | -139 | 14μs |
| 180 | -50 | -144 | 5μs |

| ID | VIDEO |
|---|---|
|    | IP ADDRESS |
| 1  | 192.168.0.a |
| 2  | 192.168.0.b |
| ...| ... |
| 7  | 192.168.0.g |

FIG. 6B

| ID | DIRECTIVITY |
|---|---|
| 1 | A, B |
| 2 | A, H |
| 3 | A, G, H |
| 4 | G, H |
| 5 | E, F |
| 6 | D, E |
| 7 | C, D |

FIG. 6C

| ID | AUDIO |
|---|---|
|    | IP ADDRESS |
| 1  | 192.168.0.h |
| 2  | 192.168.0.i |
| ...| ... |
| 7  | 192.168.0.n |

FIG. 6D

| ID | IP ADDRESS | |
|---|---|---|
|    | VIDEO | AUDIO |
| 1  | 192.168.0.a | 192.168.0.h |
| 2  | 192.168.0.b | 192.168.0.i |
| ...| ... | ... |
| 7  | 192.168.0.g | 192.168.0.n |

FIG. 6E

| ID | VIDEO | AUDIO |
|---|---|---|
|    | IP ADDRESS | IP ADDRESS |
| 1  | 192.168.0.a | 192.168.0.h |

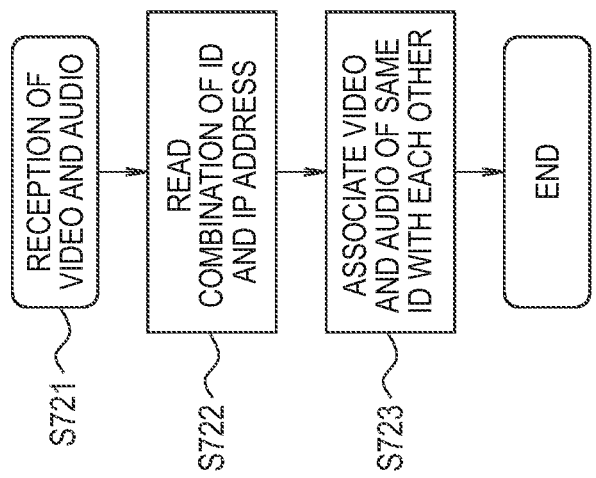
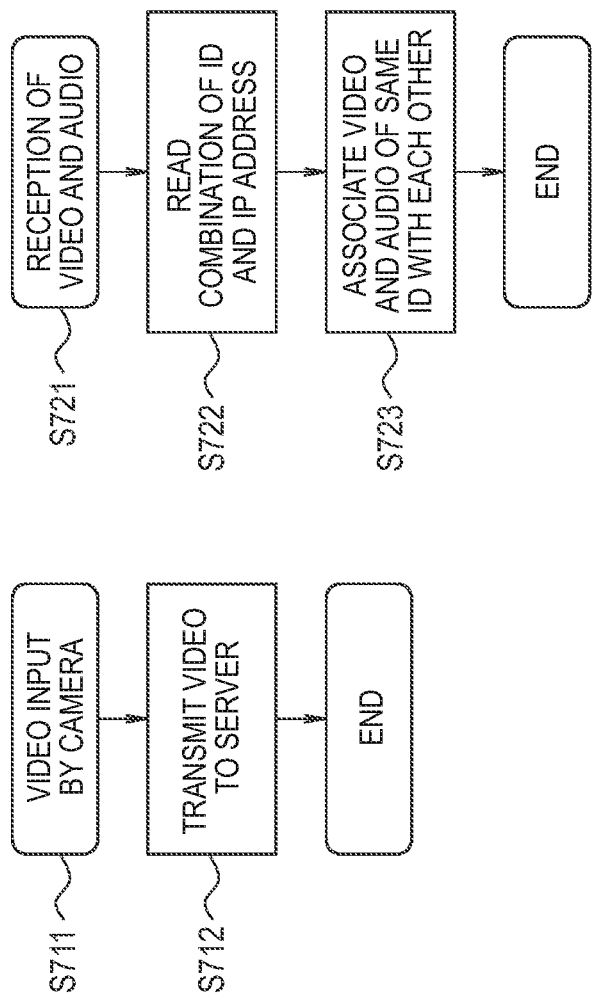
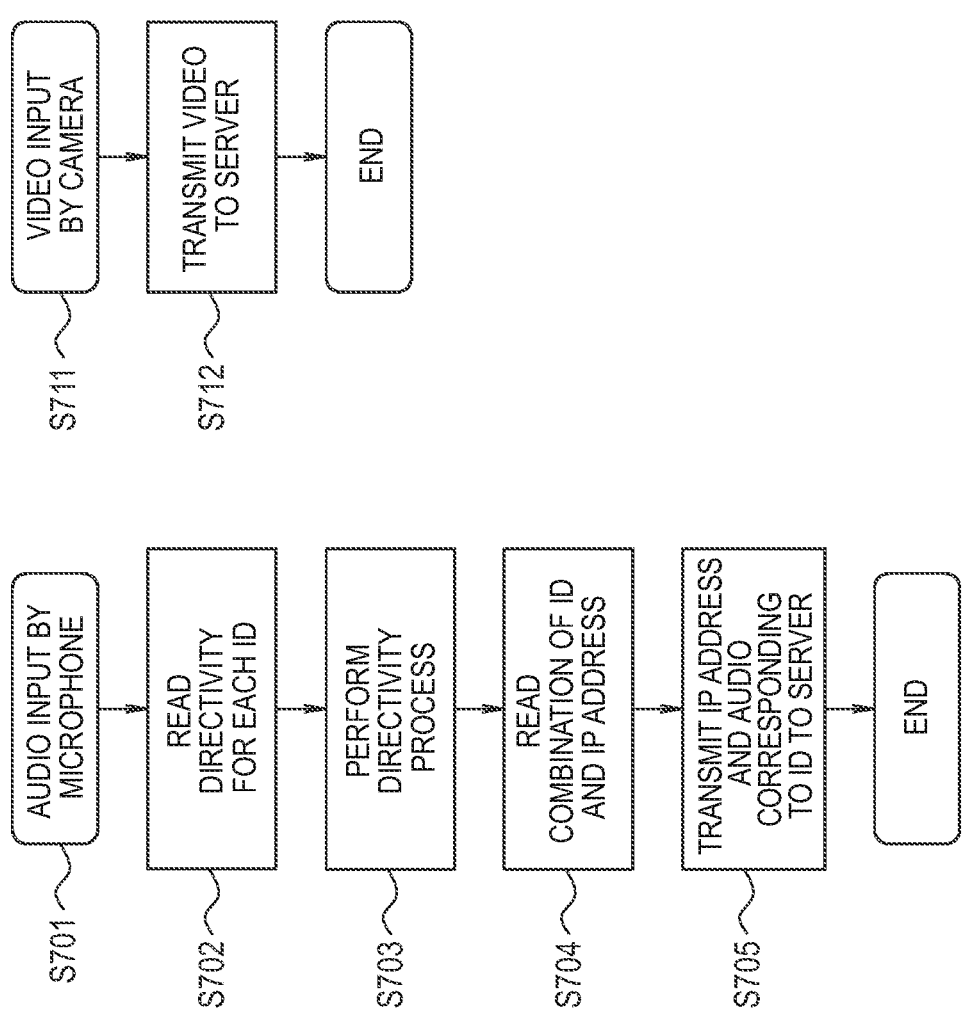

| ID | DIRECTIVITY DIRECTION | DIRECTIVITY RANGE |
|----|----------------------|-------------------|
| 1  | $\Theta_1$           | $\Phi_1$          |
| 2  | $\Theta_2$           | $\Phi_2$          |
| 3  | $\Theta_3$           | $\Phi_3$          |
| 4  | $\Theta_4$           | $\Phi_4$          |
| 5  | $\Theta_5$           | $\Phi_5$          |
| 6  | $\Theta_6$           | $\Phi_6$          |
| 7  | $\Theta_7$           | $\Phi_7$          |

US 10,939,030 B2

VIDEO AUDIO PROCESSING SYSTEM AND METHOD OF CONTROLLING THE VIDEO AUDIO PROCESSING SYSTEM

BACKGROUND OF THE INVENTION

Field of the Invention

The present invention relates to a video audio processing system and a method of controlling the video audio processing system.

Description of the Related Art

In Japanese Patent Application Laid-Open No. 2008-193196, a capturing apparatus includes an image capturing unit that obtains an image and a microphone unit that converts input external audio into a plurality of audio signals and outputs the signals along with an image display unit that displays the image. The capturing apparatus specifies a specific subject in the image displayed on the display unit and calculates the direction of the specific subject from the image capturing unit based on coordinate information and a capturing angle of view of the specified subject. After that, the capturing apparatus generates a composite audio signal, which corresponds to the direction of the specific subject, from the audio signals based on the calculated direction of the specific subject and outputs the composite audio signal to the outside.

Japanese Patent Application Laid-Open No. 2008-193196 is based on the premise that a microphone is prepared for each camera. For sound recording of a plurality of cameras during picture recording, it is necessary to connect a microphone to all the recording cameras or prepare the cameras with built-in microphones.

SUMMARY OF THE INVENTION

A video audio processing system according to the present invention is characterized by comprising: a plurality of network cameras configured to generate video data, the network cameras having IP addresses allocated thereto; a plurality of communication devices configured to transmit audio data collected by microphones, the communication devices having IP addresses allocated thereto; and a server device configured to generate a video file associated with the audio data, the server device having: a holding unit configured to hold a table for associating the IP addresses of the network cameras out of the plurality of network cameras with the IP address of at least one of the communication devices; and an associating unit configured to generate a file by associating, in a case where video transmitted from one of the plurality of network cameras is obtained, video data transmitted from the network camera with the audio data transmitted from the microphone having an IP address corresponding to the IP address transmitted from the network camera, the video data and the audio data being associated with each other with reference to the table.

Further features of the present invention will become apparent from the following description of exemplary embodiments with reference to the attached drawings.

BRIEF DESCRIPTION OF THE DRAWINGS

FIGS. 6A, 6B, 6C, 6D and 6E indicate a storing unit that stores IDs, IP addresses and directivity conditions.

FIGS. 7A, 7B and 7C are flowcharts of a method of controlling the video audio processing system.

DESCRIPTION OF THE EMBODIMENTS

Preferred embodiments of the present invention will now be described in detail in accordance with the accompanying drawings.

Figure 1B:
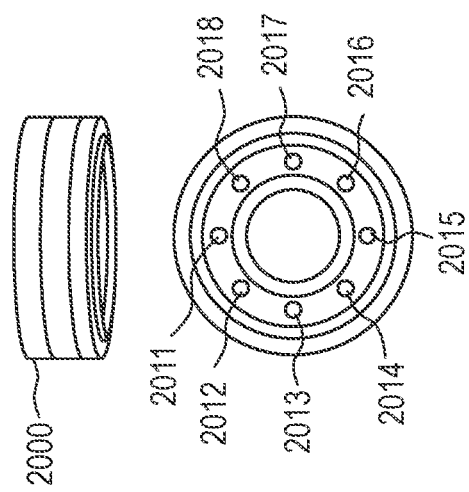
FIGS. 1A and 1B illustrate a configuration example of a video audio processing system.
Figure 1A:
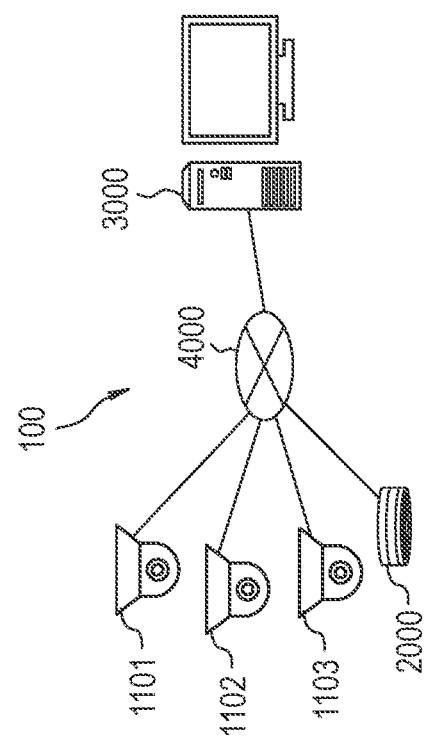

FIG. 1A illustrates a configuration example of a video audio processing system 100 according to an embodiment of the present invention. The video audio processing system 100 includes a camera 1101, a camera 1102, a camera 1103, a microphone 2000, a server device 3000 and a network 4000. The camera 1101, the camera 1102, the camera 1103, the microphone 2000 and the server device 3000 can communicate with one another via the network 4000. The number of microphones 2000 is smaller than the number of cameras 1101 to 1103.

The camera 1101 is a network camera that generates video data and transmits the video data via the network 4000. The camera 1101 corresponds to a capturing apparatus. The camera 1102 and the camera 1103 are identical to the camera 1101. The video audio processing system 100 may include a plurality of cameras in addition to the cameras 1101 to 1103. The cameras 1101 to 1103 may include a zoom drive mechanism, a pan drive mechanism, and a tilt drive mechanism.

The microphone 2000 is a network microphone that receives audio and transmits the received audio via the network 4000. The microphone 2000 corresponds to an audio input apparatus. FIG. 1B illustrates a configuration example of the microphone 2000. The microphone 2000 has a plurality of microphones (sound collecting units) 2011 to 2018. The number of microphones 2011 to 2018 is not limited to eight and may be larger or smaller than eight.

The server device 3000 can communicate with the cameras 1101 to 1103 and the microphone 2000 via the network 4000. The cameras 1101 to 1103, the microphone 2000, and the server device 3000 transmit various commands to other apparatuses via the network 4000 and transmit responses to the apparatuses when receiving commands from the apparatuses. The server device 3000 is an example of a processor, e.g., a personal computer (PC).

The network 4000 includes routers satisfying communication standards such as Ethernet (registered trademark), switches, and cables. The communication standards, the size, and configuration of the network 4000 are negligible as long as the cameras 1101 to 1103, the microphone 2000, and the server device 3000 can communicate with one another. For example, the network 4000 may include the Internet, a wired local area network (LAN), a wireless LAN, and a wide area network (WAN). The cameras 1101 to 1103 may be, for example, surveillance cameras compliant with Power over Ethernet (PoE, registered trademark). Power may be supplied to the cameras via a LAN cable.

Figure 2:
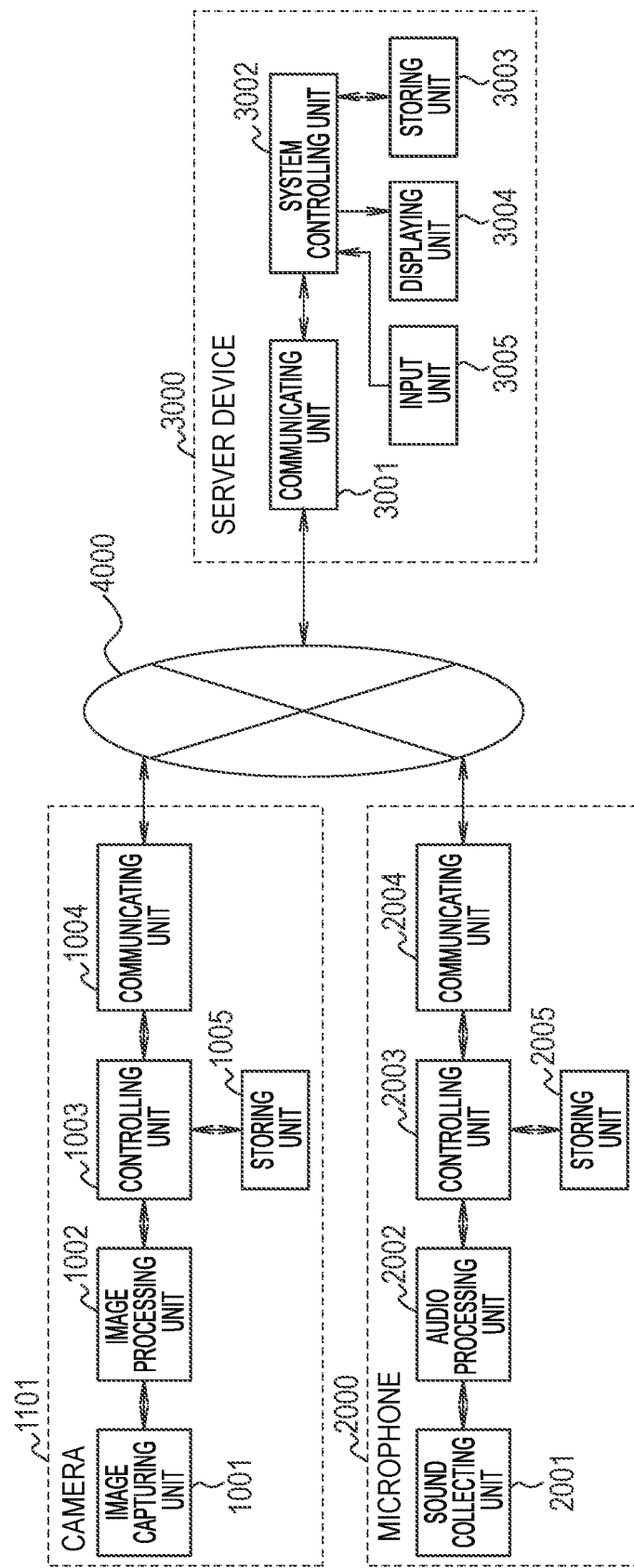
FIG. 2 is a block diagram of a camera, a microphone and a server device.

FIG. 2 is a block diagram of the camera 1101, the microphone 2000 and the server device 3000. The camera 1101 includes an image capturing unit 1001, an image processing unit 1002, a controlling unit 1003, a communicating unit 1004, and a storing unit 1005. The cameras 1102 and 1103 are identical in configuration to the camera 1101.

The image capturing unit 1001 includes a lens and an image capturing element of CCD or CMOS. The image capturing unit 1001 captures an image of a subject according to an angle of view determined by the lens settings and the like and generates a video signal through photoelectric conversion. The image processing unit 1002 performs predetermined image processing and compression encoding on the video signal generated by the image capturing unit 1001, generating video data. The controlling unit 1003 controls the image capturing unit 1001 and the image processing unit 1002 based on image capturing conditions set by a user or image capturing conditions automatically determined by the controlling unit 1003. In this case, the image capturing conditions include image-capturing gain conditions, gamma conditions, dynamic range conditions, exposure conditions, and focus conditions.

Figure 3:
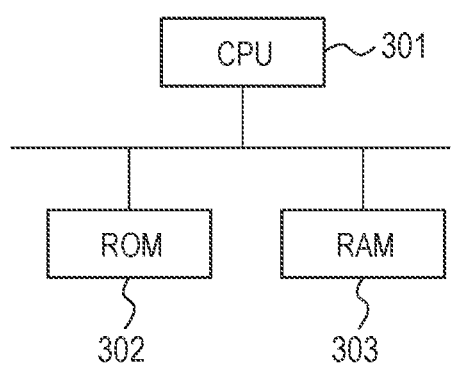
FIG. 3 illustrates a CPU, a ROM and a RAM.

The controlling unit 1003 includes, as illustrated in FIG. 3, a CPU 301, a ROM 302 and a RAM 303. The controlling unit 1003 analyzes camera control commands received from, for example, the microphone 2000 and the server device 3000 via the network 4000 and performs processing according to the camera control commands. For example, the controlling unit 1003 instructs the image processing unit 1002 to adjust picture quality, perform zoom and focus control, and make a pan or tilt, and combines and transmits audio data and video data. The controlling unit 1003 further includes the CPU 301 and integrally controls the constituent elements of the camera 1101 and sets parameters or the like. Furthermore, the controlling unit 1003 includes the ROM 302 and the RAM 303 that store data and executes a program stored in one of the ROM 302 and the RAM 303. The RAM 303 includes a storage region for the program executed by the controlling unit 1003, a work region in which the program is being executed, and a data storage region. The controlling unit 1003 further includes a clock unit, thereby providing a time stamp for obtained data.

The communicating unit 1004 receives audio data transmitted from the microphone 2000 via the network 4000, performs proper packet processing on the data, and then outputs the data to the controlling unit 1003. Moreover, the communicating unit 1004 receives a command from the microphone 2000 and transmits a response to the received command to the microphone 2000. The communicating unit 1004 further transmits the video data to the server device 3000 via the network 4000. The communicating unit 1004 further receives a camera control command transmitted from the server device 3000, performs proper packet processing or the like on the data, and then outputs the data to the controlling unit 1003. Moreover, the communicating unit 1004 transmits a response to the command received from the server device 3000, to the server device 3000.

The storing unit 1005 stores information for associating the video data generated by the camera 1101 with the audio data generated by the microphone 2000.

Referring to FIG. 2, the unit configurations and functions of the microphone 2000 will be described below. The microphone 2000 includes a sound collecting unit 2001, an audio processing unit 2002, a controlling unit 2003, a communicating unit 2004, and a storing unit 2005. Each of the eight microphones 2011 to 2018 has at least the sound collecting unit 2001.

The sound collecting unit 2001 includes electrodes of vibrating membranes and fixing plates or the like. A distance between the electrodes changes with vibrations caused by a sound pressure on the vibrating membranes, so that audio is converted to an electrical audio signal by fluctuations in voltage. The sound collecting unit 2001 may include an amplifier for amplifying the voltage of the audio signal.

The audio processing unit 2002 performs audio processing and compression encoding on the audio signal generated by the sound collecting unit 2001, generating audio data. The controlling unit 2003 controls the sound collecting unit 2001 and the audio processing unit 2002 based on audio input conditions set by a user or audio input conditions automatically determined by the controlling unit 2003. The audio input conditions include volume gain conditions, audio frequency characteristic conditions, audio directivity direction conditions and audio directivity range conditions.

The controlling unit 2003 includes, as illustrated in FIG. 3, the CPU 301, the ROM 302 and the RAM 303. The controlling unit 2003 analyzes control commands received from, for example, the camera 1101 and the server device 3000 via the network 4000 and performs processing according to the control commands. For example, the controlling unit 2003 provides an instruction to control a destination of the audio data having undergone the audio processing. The controlling unit 2003 further includes the CPU 301 and integrally controls the constituent elements of the microphone 2000 and sets parameters or the like. Furthermore, the controlling unit 2003 includes the ROM 302 and the RAM 303 that store data and executes a program stored in one of the ROM 302 and the RAM 303. The RAM 303 includes a storage region for the program executed by the controlling unit 2003, a work region in which the program is being executed, and a data storage region. The controlling unit 2003 further includes a clock unit, thereby providing a time stamp for obtained data. Moreover, the controlling unit 2003 performs a directivity process (signal processing for emphasizing audio from a desired direction and suppressing audio from a direction other than the desired direction) on the audio signals of the two microphones 2011 and 2012 and outputs the audio signals having undergone the directivity process.

Figures 4A, 4B:
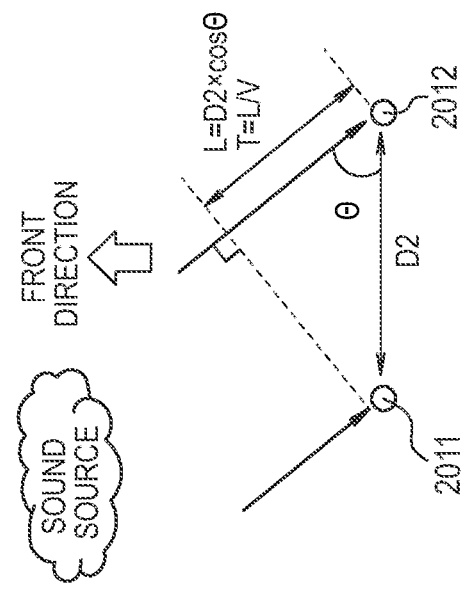
FIGS. 4A and 4B illustrate that sound from a sound source reaches the microphone.

Referring to FIGS. 4A and 4B, the directivity process will be described below. FIG. 4A illustrates that sound from a sound source reaches the microphone 2011 and the microphone 2012 from a direction at an angle θ. The microphone 2011 and the microphone 2012 are placed at a distance D2 apart. A difference in distance between the sound source and the microphone 2011 and a distance between the sound source and the microphone 2012 is expressed by the following equation:

$$L=D2\times\cos\theta.$$

If a sound velocity is expressed as V, a time T from the arrival of sound at the microphone 2011 from the sound source to the arrival of sound at the microphone 2012 from the sound source is expressed by the following formula:

$$T=L/V=D2\times\cos\theta/V.$$

FIG. 4B indicates the values of L and T with respect to an angle θ and differences in T when D2=50 mm and V=346.75 m/s are established. For example, in the case of θ=0 deg, L=50 mm and T=144 μs are established. In the case of θ=15 deg, L=48 mm and T=139 μs are established. A difference in T between θ=0 deg and θ=15 deg is 5 μs.

The controlling unit 2003 performs an operation on the directivity process based on the time T. For example, audio is to be emphasized (directivity is to be set) in the front direction (90 deg) in the following description. In this case, the controlling unit 2003 performs an operation for emphasizing audio (audio of T=0 μs) that reaches the microphone 2011 and the microphone 2012 at the same time and suppressing audio (audio of T≠0 μs) that reaches the microphones at different times.

The communicating unit 2004 further transmits the audio data to the server device 3000 via the network 4000. The communicating unit 2004 receives a control command transmitted from the server device 3000, performs proper packet processing on the command, and then outputs the command to the controlling unit 2003. Moreover, the communicating unit 2004 transmits a response to the command received from the server device 3000, to the server device 3000.

The storing unit 2005 stores information for associating the video data generated by the cameras 1101 to 1103 with the audio data generated by the microphone 2000.

Referring to FIG. 2, the unit configurations and functions of the server device 3000 will be described below. The server device 3000 is, for example, a general-purpose computer such as a personal computer. The server device 3000 includes a communicating unit 3001, a system controlling unit 3002, and a storing unit 3003.

The communicating unit 3001 receives video data from the cameras 1101 to 1103 via the network 4000 and receives audio data from the microphone 2000. Moreover, the communicating unit 3001 transmits a control command to the cameras 1101 to 1103 or the microphone 2000 and receives a response to the control command.

The system controlling unit 3002 includes, as illustrated in FIG. 3, the CPU 301, the ROM 302 and the RAM 303. The system controlling unit 3002 generates a camera control command in response to a user operation and transmits the camera control command to the cameras 1101 to 1103 via the communicating unit 3001. The system controlling unit 3002 stores, in the storing unit 3003, video data received from the cameras 1101 to 1103 via the communicating unit 3001. The system controlling unit 3002 further includes the CPU 301 and integrally controls the constituent elements of the server device 3000 and sets parameters or the like. Furthermore, the system controlling unit 3002 includes the ROM 302 and the RAM 303 that store data and executes a program stored in one of the ROM 302 and the RAM 303. The RAM 303 includes a storage region for the program executed by the system controlling unit 3002, a work region in which the program is being executed and a data storage region. The system controlling unit 3002 further includes a clock unit, thereby providing a time stamp for obtained data.

The storing unit 3003 stores data acquired by the cameras 1101 to 1103 and the microphone 2000. The system controlling unit 3002 reads data stored in the storing unit 3003 and transfers the data.

Figure 5:
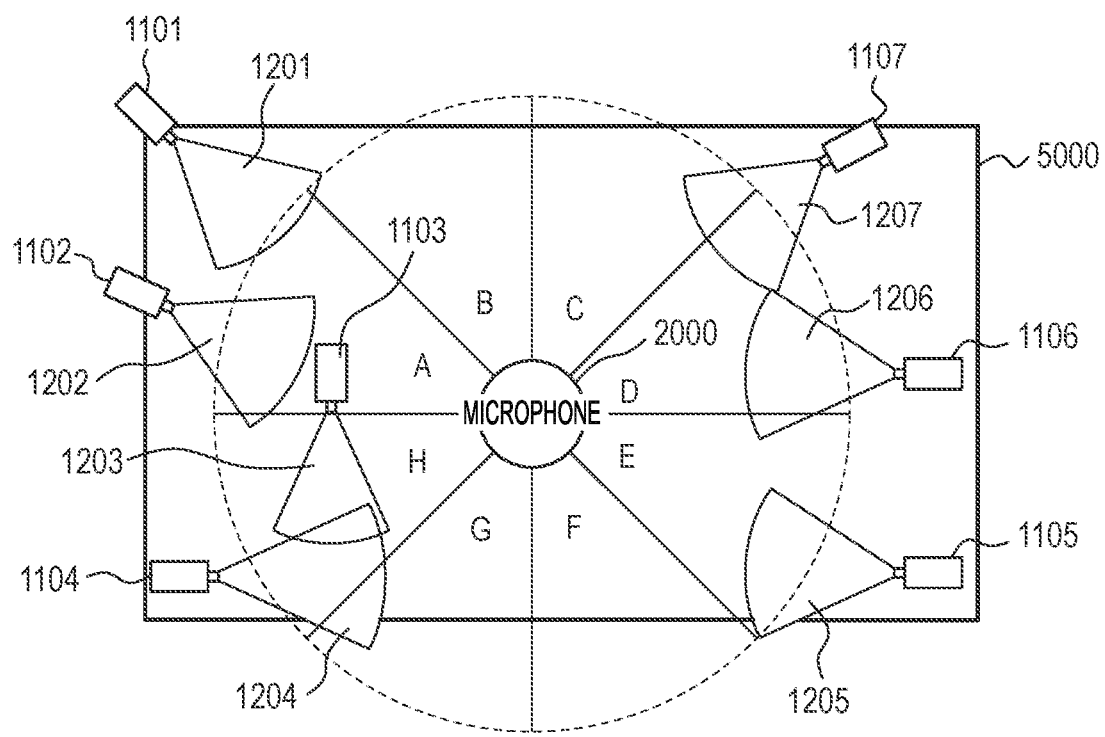
FIG. 5 illustrates the capturing ranges of the cameras and the collecting range of the microphone.

FIG. 5 illustrates the layout of cameras 1101 to 1107 and the microphone 2000 that are installed in a room 5000, capturing ranges 1201 to 1207 of the cameras 1101 to 1107 and collecting ranges A to H of the microphone 2000. The cameras 1102 to 1107 are identical in configuration to the camera 1101 and are connected to the network 4000. The number of microphones 2000 is smaller than the number of cameras 1101 to 1107. Referring to FIG. 5, a method of determining the collecting ranges in the directivity process of the microphone 2000 will be described below. If the cameras 1101 to 1107 are installed in the room 5000, the server device 3000 displays a top view of the room 5000 by camera management software as illustrated in FIG. 5. The server device 3000 displays the capturing ranges 1201 to 1207 of the cameras 1101 to 1107 and automatically sets the capturing ranges 1201 to 1207 according to user settings and the angles of view of the cameras 1101 to 1107. The areas of the collecting ranges A, B, C, D, E, F, G and H, in which the directivity of the microphone 2000 can be set, are separated and one of the collecting ranges A to H is selected for the microphone 2000, thereby specifying a collecting area. For example, if the directivity of the microphone 2000 is specified in the collecting ranges A and B, only sound from the sound source in the areas of the collecting ranges A and B can be collected. The collecting ranges A to H are provided for the respective microphones 2011 to 2018. The microphone 2000 collects audio at multiple locations or in multiple directions and performs a directivity process on audio at the locations or in the directions, so that a plurality of audio data segments are generated for the respective cameras 1101 to 1107.

FIGS. 6A to 6E indicate a correspondence between directivity and IDs and IP addresses for associating the video data of the cameras 1101 to 1107 with the audio data of the microphone 2000. In the present embodiment, an IP address is allocated to each of the cameras 1101 to 1107 and the microphone 2000 is provided with a plurality of communication devices having a plurality of IP addresses. As indicated in FIG. 6A, an ID is allocated to each of the cameras. For example, the ID of the camera 1101 is 1. The ID of the camera 1102 is 2. The ID of the camera 1103 is 3. The ID of the camera 1104 is 4. The ID of the camera 1105 is 5. The ID of the camera 1106 is 6. The ID of the camera 1107 is 7.

FIG. 6A is a table indicating a correspondence between the IDs and the IP addresses (identification information) of the cameras 1101 to 1107. FIG. 6B is a table indicating a collecting range of the directivity of the microphone 2000 for each ID of the cameras 1101 to 1107. The collecting range of the directivity of the microphone 2000 is information on the directivity of the microphone 2000. For example, for the ID "1" of the camera 1101, the collecting ranges A and B of directivity corresponding to the capturing range 1201 of the camera 1101 are set.

FIG. 6C is a table indicating a correspondence between the IDs of the cameras 1101 to 1107 and the IP addresses (identification information) of communication devices for audio data. For example, the IP address of the communication device for outputting the audio data of the collecting ranges A and B is associated with the ID "1" of the camera 1101. The IP address of the communication device for outputting the audio data of the collecting ranges A and H is associated with the ID "2" of the camera 1102. FIG. 6D is a table indicating a correspondence between the IDs of the cameras 1101 to 1107 and the IP addresses of the cameras and the IP addresses of the communication devices for outputting corresponding audio data. FIG. 6E indicates a correspondence between the ID and the IP address of the camera and the ID and the IP address of the communication device for outputting corresponding audio data. In this example, the ID of the camera is "1".

FIGS. 7A to 7C are flowcharts of a method of controlling the video audio processing system 100. FIG. 7A is a flowchart of a method of controlling the microphone 2000. In S701, the sound collecting units 2001 of the microphones 2011 to 2018 collect sound and convert audio into electrical audio signals. The audio processing unit 2002 performs audio processing and compression encoding on the audio signal and generates audio data.

In S702, referring to the table of FIG. 6B in the storing unit 2005, the controlling unit 2003 reads the collecting ranges of directivity of the microphone 2000 according to the IDs of the cameras 1101 to 1107.

In S703, the controlling unit 2003 performs the directivity process on the audio data of the microphones 2011 to 2018 based on the collecting ranges of the directivity, the collecting ranges being read in S702 according to the IDs of the cameras 1101 to 1107, and generates the audio data of each of the IDs. For example, for the ID of the camera 1101, the controlling unit 2003 performs the directivity process based on the collecting ranges A and B of the directivity of the microphone 2000 and generates audio data for the ID of the camera 1101.

In S704, referring to the table of FIG. 6C stored in the storing unit 2005, the controlling unit 2003 reads the IP addresses of audio data according to the IDs of the cameras 1101 to 1107.

In S705, the controlling unit 2003 associates the audio data generated for the IDs in S703 with the IP addresses of the communication devices for outputting the audio data according to the IDs of the cameras 1101 to 1107 read in S704. Subsequently, the controlling unit 2003 transmits the associated IP addresses and the audio data to the server device 3000.

FIG. 7B is a flowchart of a method of controlling the cameras 1101 to 1107. In S711, the image capturing units 1001 of the cameras 1101 to 1107 capture subject images and generate video signals. The image processing units 1002 of the cameras 1101 to 1107 perform image processing and compression encoding on the video signals and generate video data.

In S712, referring to the table of FIG. 6A stored in the storing unit 1005, the controlling units 1003 of the cameras 1101 to 1107 read IP addresses according to the IDs of the cameras. The controlling units 1003 of the cameras 1101 to 1107 associate the IP addresses read according to the IDs of the cameras with the video data generated by the cameras of the IDs, and transmit the IP addresses and the video data to the server device 3000.

FIG. 7C is a flowchart of a method of controlling the server device 3000. In S721, the system controlling unit 3002 receives the IP addresses of the IDs and the video data from the cameras 1101 to 1107 via the communicating unit 3001. Moreover, the system controlling unit 3002 receives, via the communicating unit 3001, the audio data and the IP addresses of the communication devices for outputting the audio data according to the IDs from the microphone 2000.

In S722, the system controlling unit 3002 reads combinations of IP addresses for the IDs of the cameras 1101 to 1107 and the IP addresses of the communication devices for outputting the corresponding audio data, based on the table of FIG. 6D stored in the storing unit 3003.

In S723, the system controlling unit 3002 associates the corresponding video data and the audio data based on the IP address of the camera of the same ID and the IP address of the audio data, and records the data as an MPEG file in the storing unit 3003. The system controlling unit 3002 can play back the MPEG file including the video data and the audio data, based on the IP address of the camera.

In another embodiment of the present invention, the cameras 1101 to 1107 associate video data and audio data of the same ID. The configurations and connections of the cameras 1101 to 1107, the microphone 2000 and the server device 3000 are identical to those of Embodiment 1 and thus the description thereof is omitted. Furthermore, a directivity process is also identical to that of Embodiment 1 and thus the description thereof is omitted.

Figure 8C:
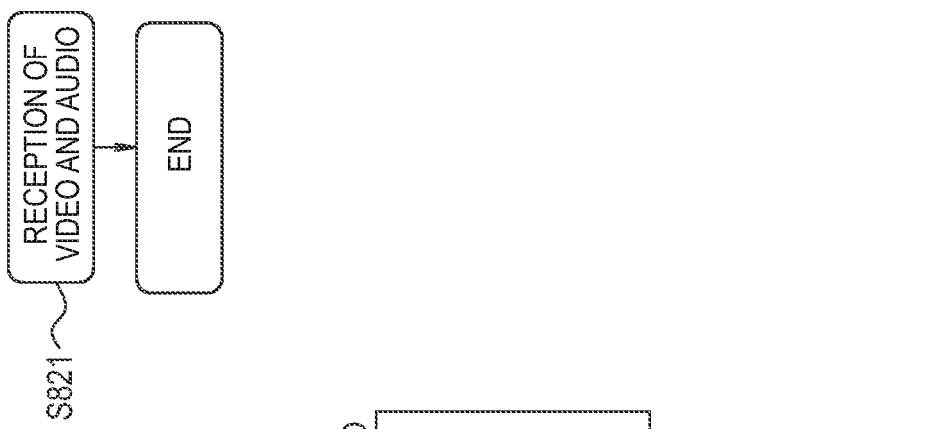
FIGS. 8A, 8B and 8C are flowcharts of a method of controlling the video audio processing system.
Figure 8B:
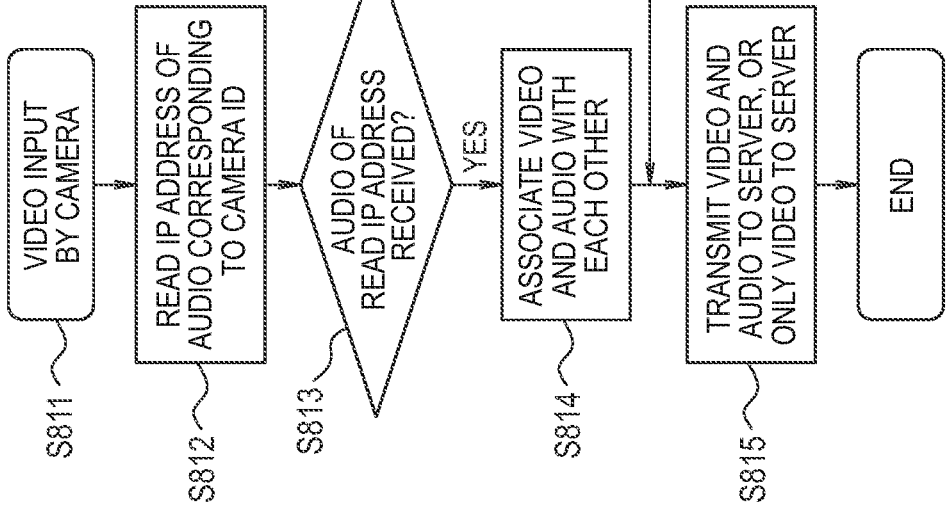
Figure 8A:
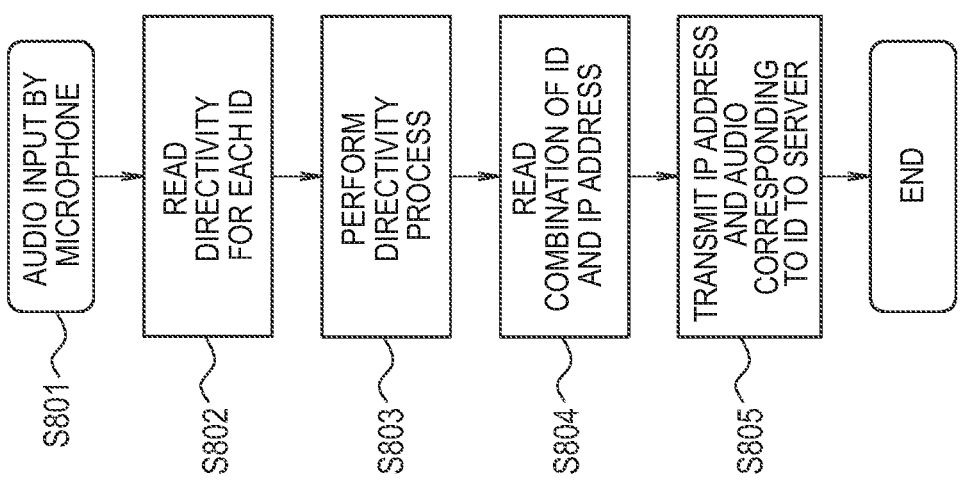

FIGS. 8A to 8C are flowcharts of a method of controlling the video audio processing system 100 according to another embodiment. FIG. 8A is a flowchart of a method of controlling the microphone 2000. The microphone 2000 performs the processing of S801 to S804. The processing of S801 to S804 is identical to that of S701 to S704 in FIG. 7A. In S805, the controlling unit 2003 associates IP addresses read for audio data in S804 according to the IDs of the cameras 1101 to 1107 and audio data generated for the IDs in S803, and then the controlling unit 2003 outputs the IP addresses and the audio data to the cameras 1101 to 1107.

FIG. 8B is a flowchart of a method of controlling the cameras 1101 to 1107. As indicated by FIG. 6E, the storing unit 1005 of the camera 1101 stores a table of a combination of an IP address corresponding to the ID of the camera 1101 and audio data. Similarly, the storing units 1005 of the cameras 1102 to 1107 each stores a table of a combination of an IP address corresponding to the ID of the camera 1101 and audio data.

In S811, the image capturing units 1001 of the cameras 1101 to 1107 capture subject images and generate video signals. The image processing units 1002 of the cameras 1101 to 1107 perform image processing and compression encoding on the video signals and generate video data.

In S812, referring to the table of FIG. 6E stored in the storing unit 1005, the controlling unit 1003 of the camera 1101 reads the IP address of the communication device for outputting audio data according to the ID of the camera 1101. Similarly, referring to the table stored in the storing unit 1005, the controlling units 1003 of the cameras 1102 to 1107 read the IP addresses of the communication devices for outputting audio data according to the IDs of the cameras 1102 to 1107.

In S813, the controlling units 1003 of the cameras 1101 to 1107 receive audio data from the microphone 2000, the audio data being outputted from the communication devices whose IP addresses are read in S812 according to the IDs of the cameras 1102 to 1107. If the controlling units 1003 of the cameras 1101 to 1107 can receive the audio data, the process advances to S814. Otherwise the process advances to S815. In S815, the controlling unit 1003 transmits the video data generated in S811 and the IP address corresponding to the ID of the camera, to the server device 3000 via the communicating unit 1004.

In S814, based on the table of FIG. 6E or the like in the storing unit 1005, the controlling units 1003 of the cameras 1101 to 1107 read a combination of the IP address for the ID of the camera and the IP address of the communication device for outputting corresponding audio data. Based on the IP address for the ID of the camera and the IP address of the communication device for outputting audio data, the controlling units 1003 of the cameras 1101 to 1107 associate the video data (S811) for the ID of the camera with the audio data (S813). Furthermore, the controlling units 1003 of the cameras 1101 to 1107 generate an MPEG file including the associated video data and audio data. Thereafter, the controlling units 1003 of the cameras 1101 to 1107 advance to S815. In S815, the controlling unit 1003 transmits the MPEG file including the video data for the ID of the camera and the audio data and the IP address of the video data to the server device 3000 via the communicating unit 1004.

FIG. 8C is a flowchart of a method of controlling the server device 3000. In 5821, the system controlling unit 3002 receives the MPEG file including the video data on IDs from the cameras 1101 to 1107 and the audio data and the IP addresses of the cameras or the video data on the IDs and the IP addresses of the cameras via the communicating unit 3001. The system controlling unit 3002 can play back the MPEG file, which includes the video data and the audio data, or the video data based on the IP address of the camera.

In Embodiments 1 and 2, video data and audio data are associated with each other by using the IP addresses of the cameras 1101 to 1107 and the IP addresses of the communication devices provided in the microphone 2000. The present invention is not limited to this configuration. If the microphone 2000 does not include a plurality of communication devices, the IDs of the cameras 1101 to 1107 may be simply used as identification information and may be associated with the range of directivity for collecting audio. In other words, in this case, only FIGS. 6A and 6B may be used.

Figure 9A:
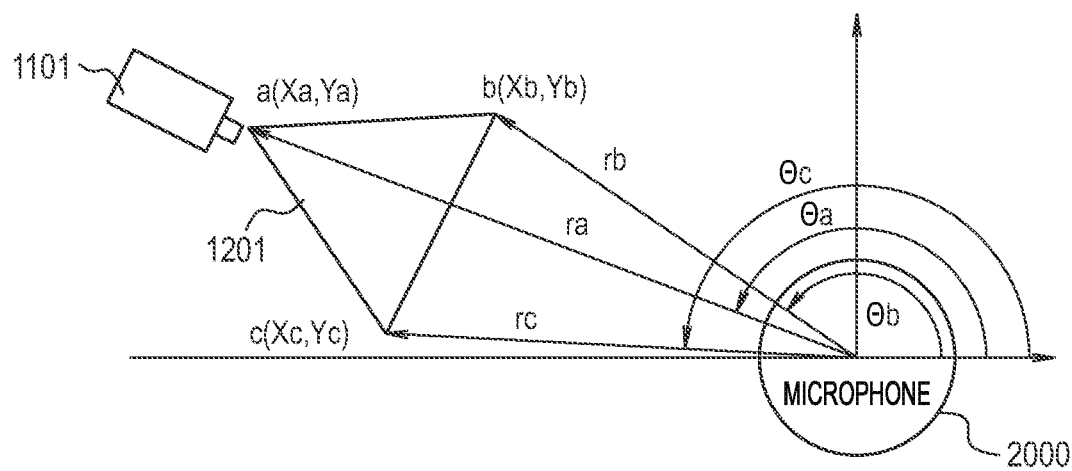
FIGS. 9A and 9B illustrate a method of calculating the polar coordinates of the capturing range of the camera.
Figures 10A, 10B:
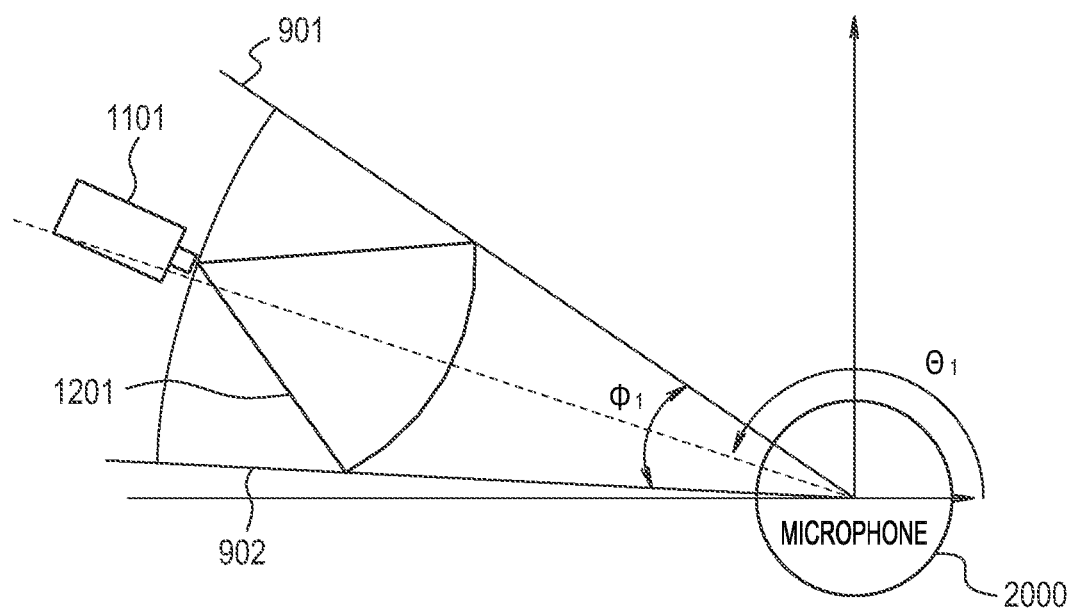
FIGS. 10A and 10B indicate the directivity directions and directivity ranges of the microphone.

FIG. 9A indicates a method of calculating the polar coordinates of the capturing range 1201 of the camera 1101 with respect to the position of the microphone 2000. A table is created as indicated in FIG. 10B. The server device 3000 calculates the polar coordinates of the capturing range 1201 of the camera 1101 and calculates the directivity direction and the directivity range of the camera 1101 based on the polar coordinates.

First, the system controlling unit 3002 sets the position coordinates a (Xa, Ya) of the camera 1101, the capturing direction of the camera 1101, the capturing angle of the camera 1101, and the capturing distance of the camera 1101 in response to a user instruction. Subsequently, the system controlling unit 3002 sets the position coordinates of the microphone 2000 in response to a user instruction.

The system controlling unit 3002 calculates the vertex coordinates a (Xa,Ya), b (Xb,Yb) and c (Xc,Yc) of the capturing range 1201 of the camera 1101 based on the information. Subsequently, the system controlling unit 3002 converts the vertex coordinates a (Xa,Ya), b (Xb,Yb) and c (Xc,Yc) of the capturing range 1201 with respect to the position coordinates of the microphone 2000 into polar coordinates (ra,θa), (rb,θb) and (rc,θc).

$$(ra,\theta a)=(\sqrt{Xa^2+Ya^2},\ \tan^{-1}(Ya/Xa))$$

$$(rb,\theta b)=(\sqrt{Xb^2+Yb^2},\ \tan^{-1}(Yb/Xb))$$

$$(rc,\theta c)=(\sqrt{Xc^2+Yc^2},\ \tan^{-1}(Yc/Xc))$$

Similarly, the system controlling unit 3002 converts the vertex coordinates of the capturing ranges 1202 to 1207 of the cameras 1102 to 1107 with respect to the position coordinates of the microphone 2000 into polar coordinates.

Figure 9B:
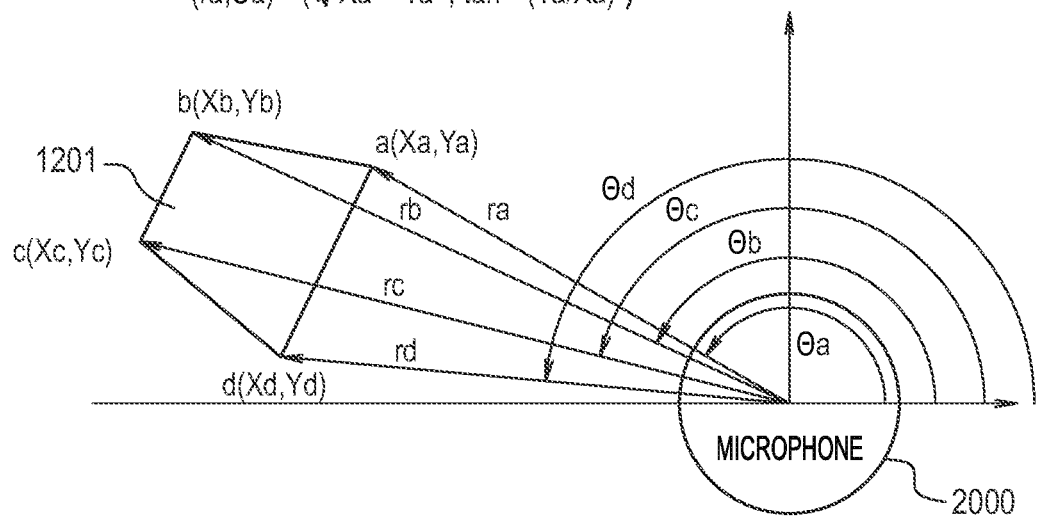

FIG. 9B illustrates another method of calculating the polar coordinates of the capturing range 1201 of the camera 1101 with respect to the microphone 2000. The server device 3000 calculates the polar coordinates of the capturing range 1201 of the camera 1101 and calculates the directivity direction and the directivity range of the camera 1101 based on the polar coordinates.

First, the system controlling unit 3002 sets the coordinates of the installation region of the camera 1101 in response to a user instruction. Subsequently, the system controlling unit 3002 sets the position coordinates of the microphone 2000 in response to a user instruction.

The system controlling unit 3002 then calculates the vertex coordinates a (Xa,Ya), b (Xb,Yb), c (Xc,Yc) and d (Xd,Yd) of the capturing range 1201 of the camera 1101 based on the information. The system controlling unit 3002 converts the vertex coordinates a (Xa,Ya), b (Xb,Yb), c (Xc,Yc) and d (Xd,Yd) with respect to the position coordinates of the microphone 2000 into polar coordinates (ra,θa), (rb,θb), (rc,θc) and (rd,θd) according to the following formula:

$$(ra,\theta a)=(\sqrt{Xa^2+Ya^2},\ \tan^{-1}(Ya/Xa))$$

$$(rb,\theta b)=(\sqrt{Xb^2+Yb^2},\ \tan^{-1}(Yb/Xb))$$

$$(rc,\theta c)=(\sqrt{Xc^2+Yc^2},\ \tan^{-1}(Yc/Xc))$$

$$(rd,\theta d)=(\sqrt{Xd^2+Yd^2},\ \tan^{-1}(Yd/Xd))$$

Similarly, the system controlling unit 3002 converts the vertex coordinates of the capturing ranges 1202 to 1207 of the cameras 1102 to 1107 with respect to the position coordinates of the microphone 2000 into polar coordinates.

FIG. 10A illustrates a directivity direction θ1 and a directivity range φ1 of the microphone 2000 so as to correspond to the capturing range 1201 of the camera 1101. The server device 3000 calculates the polar coordinates of one of FIG. 9A and FIG. 9B and then calculates the directivity direction θ1 and the directivity range φ1 of the microphone 2000 so as to correspond to the capturing range 1201 of the camera 1101.

First, the system controlling unit 3002 calculates the angles of two straight lines 901 and 902 connecting the position coordinates of the microphone 2000 and both ends of the capturing range 1201. The system controlling unit 3002 then calculates a mean angle θ1 of the angles of the two straight lines 901 and 902 as a directivity direction of the microphone 2000, the directivity direction corresponding to the capturing range 1201 of the camera 1101. Thereafter, the system controlling unit 3002 calculates an angle difference φ1 between the two straight lines 901 and 902 as a directivity range of the microphone 2000, the directivity range corresponding to the capturing range 1201 of the camera 1101.

Similarly, the system controlling unit 3002 calculates directivity directions θ2 to θ7 and directivity ranges φ2 to φ7 of the microphone 2000 according to the capturing ranges 1202 to 1207 of the cameras 1102 to 1107.

FIG. 10B is a table indicating a directivity direction and a directivity range of the microphone 2000 for each ID of the cameras 1101 to 1107. The directivity direction and the directivity range of the microphone 2000 is information on the collecting range of the microphone 2000. The server device 3000 generates the table of FIG. 10B after the calculation of FIG. 10A. The system controlling unit 3002 generates, as indicated by FIG. 10B, the table indicating the directivity directions θ1 to θ7 and the directivity ranges φ1 to φ7 of the microphone 2000 for the IDs of the cameras 1101 to 1107 after the calculation of FIG. 10A. The table of FIG. 10B is used instead of the table of FIG. 6B. The server device 3000 transmits the table of FIG. 10B to the microphone 2000. The microphone 2000 stores the table of FIG. 10B in the storing unit 2005 and performs the directivity process of S703 in FIG. 7A based on the table of FIG. 10B.

In this way, the video audio processing system 100 can collect audio corresponding to the video of the cameras 1101 to 1107 and properly associate (combine) audio data with the video data of the cameras 1101 to 1107.

If the number of microphones 2000 is smaller than the number of cameras 1101 to 1107, processing is performed as will be described below when the locations of the microphones 2000 are specified.

Figure 11:
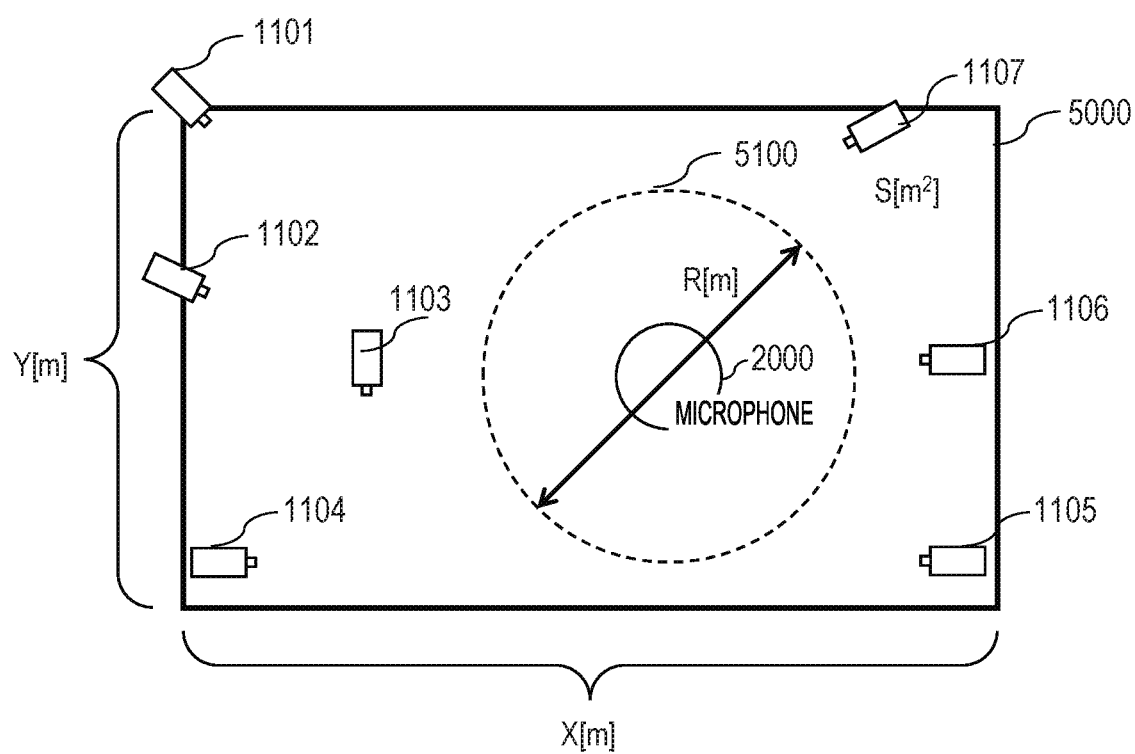
FIG. 11 illustrates the dimensions of a room where the cameras are arranged and a collecting range.

FIG. 11 illustrates the dimensions of a room 5000, in which the cameras 1101 to 1107 are arranged, and a collecting range 5100 of the microphone 2000. The server device 3000 determines the maximum number of microphones 2000 to be arranged in the room 5000, according to the dimensions of the room 5000 and the dimensions of the collecting range 5100 of the microphone 2000. Based on a horizontal dimension X[m] of the room 5000 and a vertical dimension Y[m] of the room 5000, an area S[m$^2$] of the room where the cameras 1101 to 1107 are arranged is expressed by the following formula:

$$S = X \times Y.$$

The maximum number of microphones 2000 can be determined based on a diameter R[m] of the collecting range 5100 of the microphone 2000 according to one of a first method and a second method as will be described below.

In the first method, the server device 3000 determines the maximum number of microphones 2000 by dividing the area S of the room 5000, in which the cameras 1101 to 1107 are arranged, by the area of the collecting range 5100 of the microphone 2000. A decimal is rounded up.

$$\text{The maximum number of microphones} = S \div ((R/2)^2 \times \pi)$$

In the second method, the server device 3000 determines the maximum number of microphones 2000 from the dimensions X and Y of the room 5000 where the cameras 1101 to 1107 are arranged, according to the operation of the following formula. A decimal is rounded up.

$$\text{The maximum number of microphones} = (X \div R) \times (Y \div R)$$

In this case, the dimensions X and Y may be the dimensions of the room 5000 where the cameras are arranged or the dimensions of a camera region in the room 5000 where the cameras are arranged.

Figure 12:
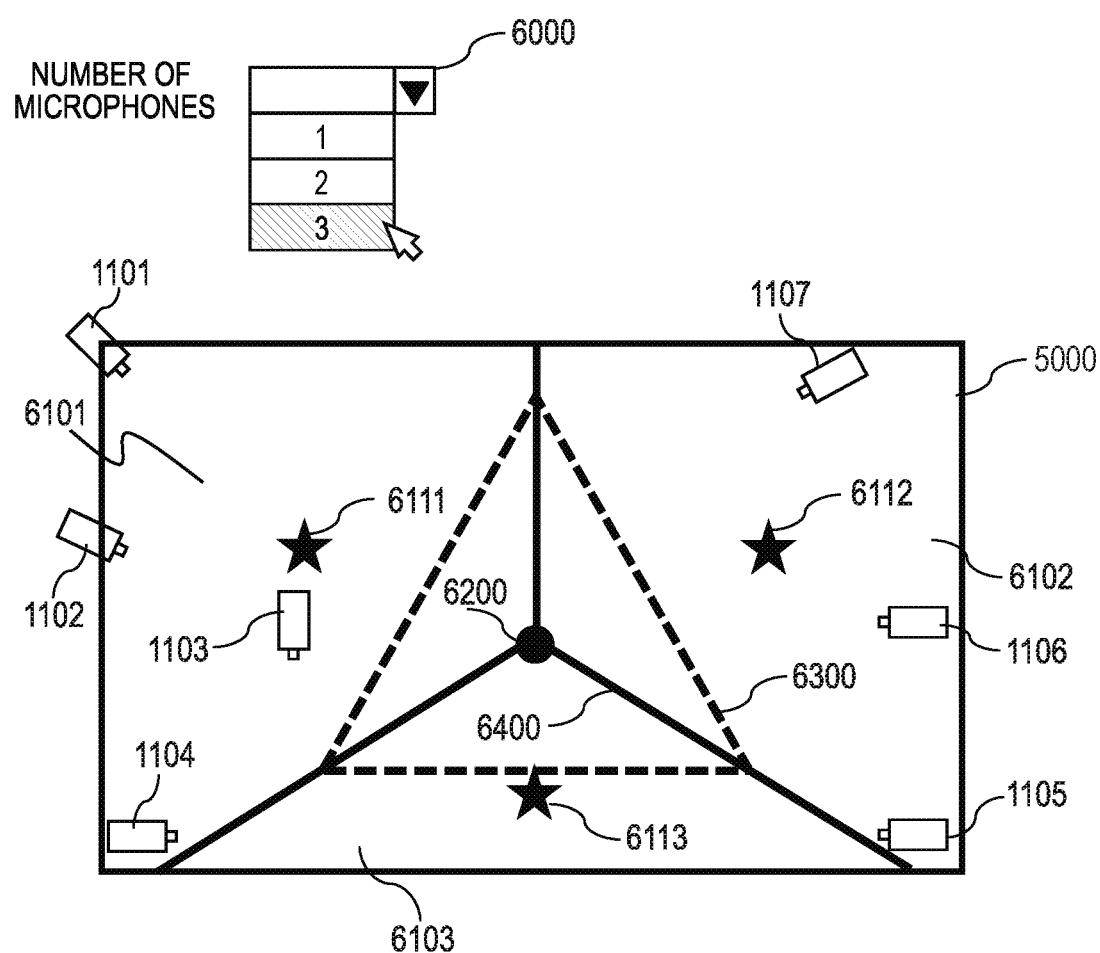
FIG. 12 illustrates a method of determining recommended candidate positions according to the number of microphones.

FIG. 12 illustrates a method of determining the recommended candidate positions of the microphones. The method of determining the recommended candidate positions by the server device 3000 will be described below. First, in response to a user operation from an input unit 3005, the server device 3000 selects a number N of microphones from a pull-down list 6000 displayed on a displaying unit 3004. The maximum number of microphones of the pull-down list 6000 is determined by the method of determining the maximum number of microphones described in FIG. 11. Subsequently, according to the selected number N of microphones, the server device 3000 generates a regular N polygon such that the center of gravity (one of the incenter and the circumcenter) 6200 of the room 5000 where the cameras are arranged is aligned with the center of gravity (one of the incenter and the circumcenter) of the regular N polygon. The center of gravity 6200 of the room 5000 may be specified by a user or may be one of the incenter and the circumcenter. In the example of FIG. 12, the number of microphones is three.

Subsequently, the server device 3000 generates N straight lines 6400 passing through the vertexes of the regular N polygon from the center of gravity 6200 and divides the room 5000 into N regions 6101 to 6103 according to the N straight lines 6400. The server device 3000 then determines the center of gravity (one of the incenter and the circumcenter) of the region 6101 as a recommended candidate position 6111, the center of gravity (one of the incenter and the circumcenter) of the region 6102 as a recommended candidate position 6112, and the center of gravity (one of the incenter and the circumcenter) of the region 6103 as a recommended candidate position 6113.

Figure 13A:
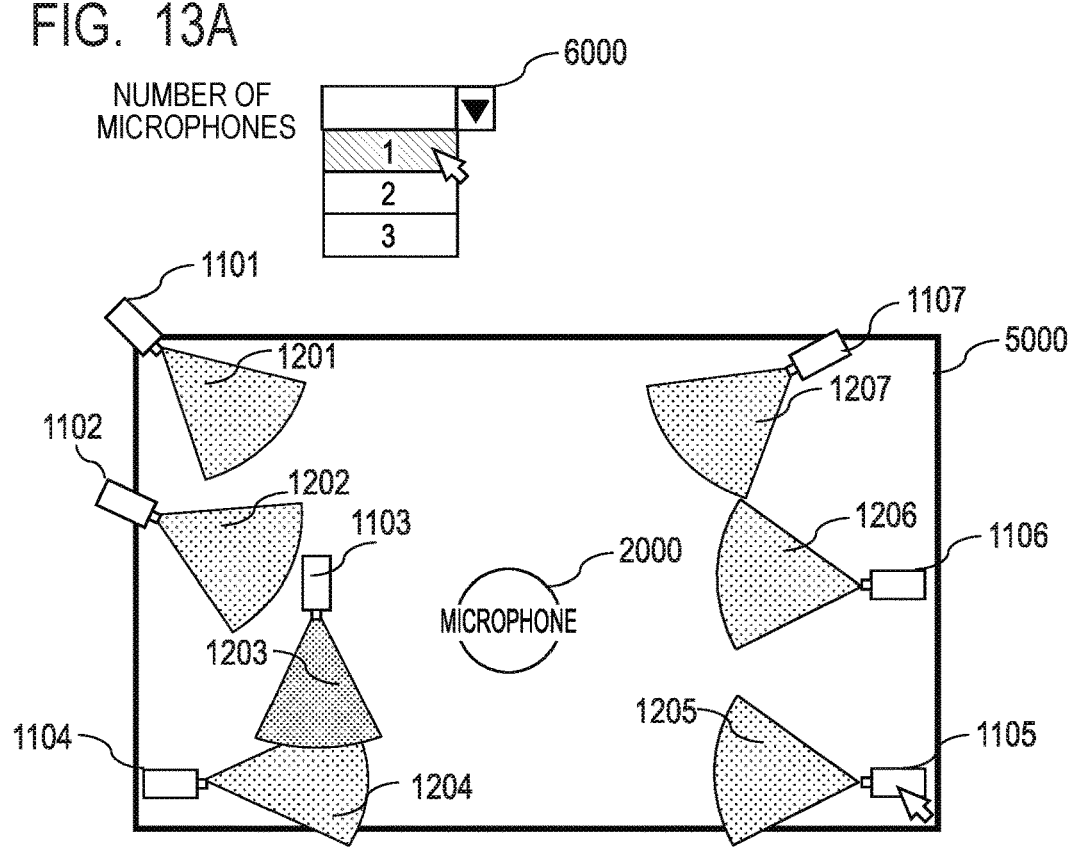
FIGS. 13A and 13B illustrate a method of displaying the capturing ranges and the arranged microphones.
Figure 13B:
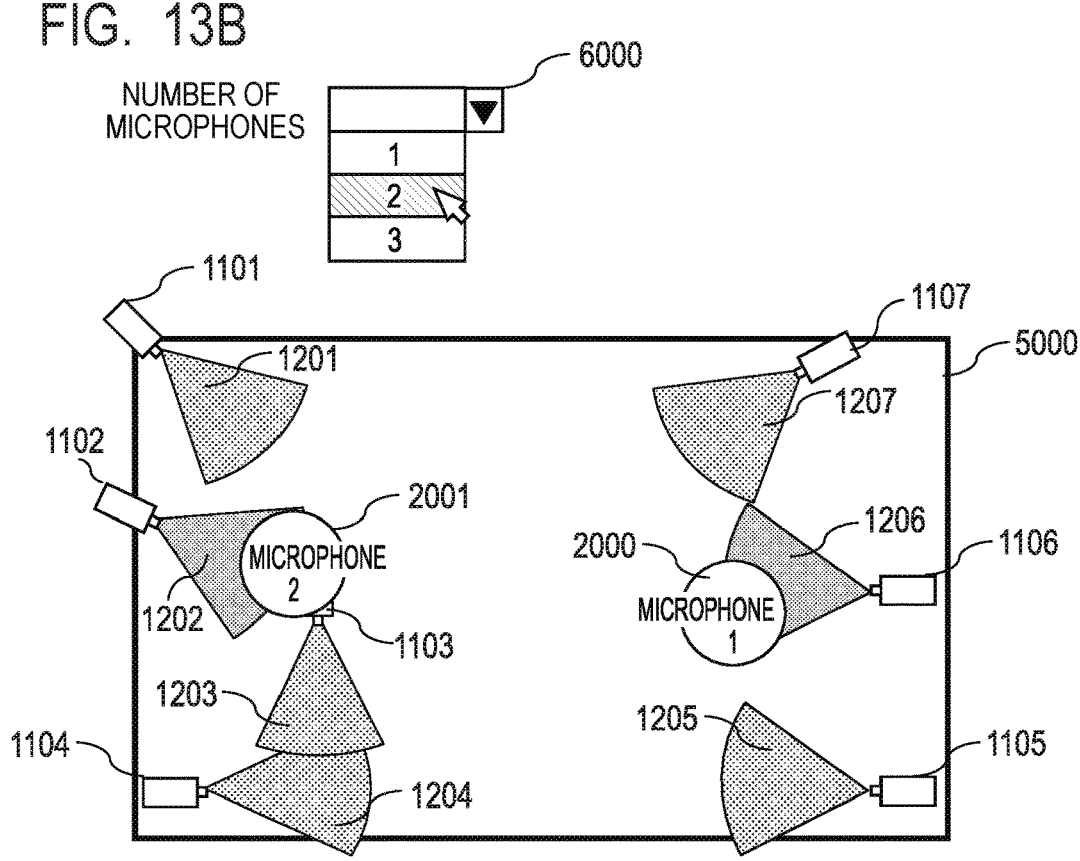

FIGS. 13A and 13B illustrate display provided by the displaying unit 3004 of the server device 3000. When a user confirms the number of microphones, as illustrated in FIGS. 13A and 13B, the system controlling unit 3002 arranges the microphones at the recommended candidate positions of the microphones in FIG. 12. The system controlling unit 3002 then displays the arrangement of the cameras 1101 to 1107, the capturing ranges 1201 to 1207 of the cameras 1101 to 1107, and the arrangement of the microphones on the displaying unit 3004. The system controlling unit 3002 displays the arrangement of the microphones according to the number of microphones selected by the user. The user can select a proper number of microphones with reference to the display of the arrangement of the microphones.

FIG. 13A illustrates a display example in which a user selects a single microphone. When the user selects one microphone from the pull-down list 6000, the system controlling unit 3002 displays the arrangement of the capturing ranges 1201 to 1207 of the cameras 1101 to 1107 and the single microphone 2000 on the displaying unit 3004.

FIG. 13B illustrates a display example in which a user selects two microphones. When the user selects two microphones from the pull-down list 6000, the system controlling unit 3002 displays the arrangement of the capturing ranges 1201 to 1207 of the cameras 1101 to 1107 and the two microphones 2000 and 2001 (sound collecting unit) on the displaying unit 3004 according to the method of FIG. 12.

The densities of the capturing ranges 1201 to 1207 in FIGS. 13A and 13B are determined according to distances from the microphones nearest the capturing ranges 1201 to 1207. The system controlling unit 3002 determines the densities of the capturing ranges 1201 to 1207 according to distances between the capturing ranges 1201 to 1207 and the microphones and displays the densities of the capturing ranges 1201 to 1207 on the displaying unit 3004. The densities of the displayed capturing ranges 1201 to 1207 increase near the microphones, that is, at a high volume of collected sound and decrease remote from the microphones, that is, at a low volume of collected sound. Distances from the microphones may be indicated by colors or patterns in the capturing ranges 1201 to 1207. The system controlling unit 3002 displays the capturing ranges 1201 to 1207 of the cameras 1101 to 1107 on the displaying unit 3004 in forms determined by distances between the capturing ranges 1201 to 1207 of the cameras 1101 to 1107 and the microphones. A user can determine the number of microphones and the locations of the microphones with reference to the densities of the capturing ranges 1201 to 1207.

Figure 14:
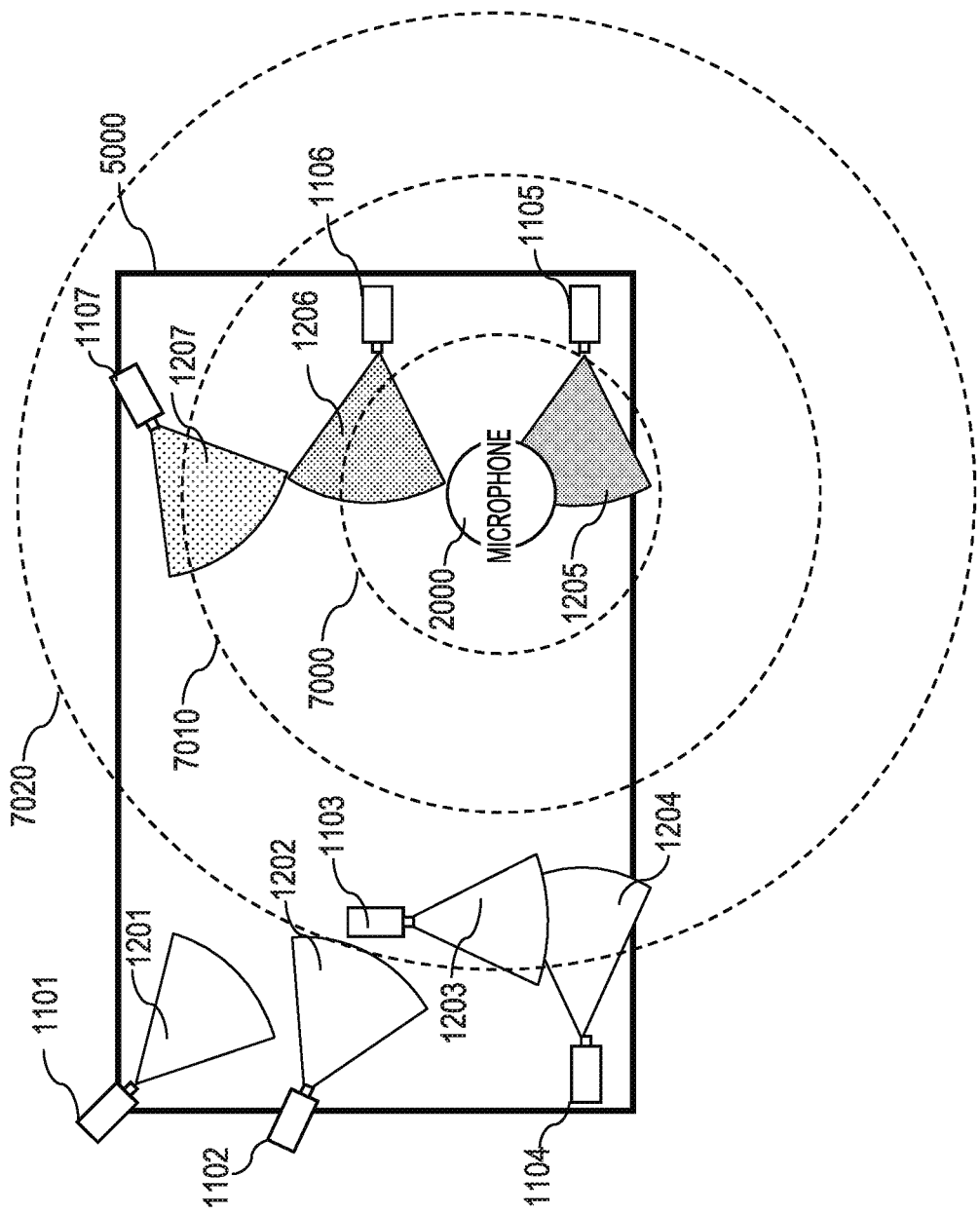
FIG. 14 illustrates the capturing ranges and a volume of collected sound according to a distance from the microphone.

FIG. 14 indicates a volume of collected sound according to distances between the capturing ranges 1201 to 1207 of the cameras 1101 to 1107 and the microphone 2000. A method of determining the densities of the capturing ranges 1201 to 1207 displayed on the displaying unit 3004 will be described below. In the following example, the system controlling unit 3002 places the microphone 2000 at a position in FIG. 14 in response to a user instruction. The system controlling unit 3002 sets three circles 7000, 7010 and 7020 around the microphone 2000. The radii of the circles 7000, 7010 and 7020 are determined according to the sound collecting capability of the microphone 2000 and thus are set in advance. The radii of the circles 7000, 7010 and 7020 may be changed by a user later because an S/N ratio may be affected by environmental noise in an arrangement environment.

The system controlling unit 3002 displays the capturing range 1205 with the highest density, the capturing range 1205 being entirely included in the inner region of the circle 7000. Moreover, the system controlling unit 3002 displays, with the second highest density, the capturing range 1206 included in the inner and outer regions of the circle 7000 and the inner region of the circle 7010 and the capturing range entirely included in the outer region of the circle 7000 and the inner region of the circle 7010. Furthermore, the system controlling unit 3002 displays, with the third highest density, the capturing range 1207 included in the inner and outer regions of the circle 7010 and the inner region of the circle 7020 and the capturing range entirely included in the outer region of the circle 7010 and the inner region of the circle 7020. The system controlling unit 3002 displays, with the fourth highest density (lowest density), the capturing ranges 1201 to 1204 at least partially included in the outer region of the circle 7020. In FIGS. 13A, 13B and 14, the correlation between the capturing ranges and the sound collection of the capturing ranges by the microphone is expressed by the densities of the displayed capturing ranges. The correlation may be expressed by changing the densities of the displayed cameras 1101 to 1107.

Figure 15A:
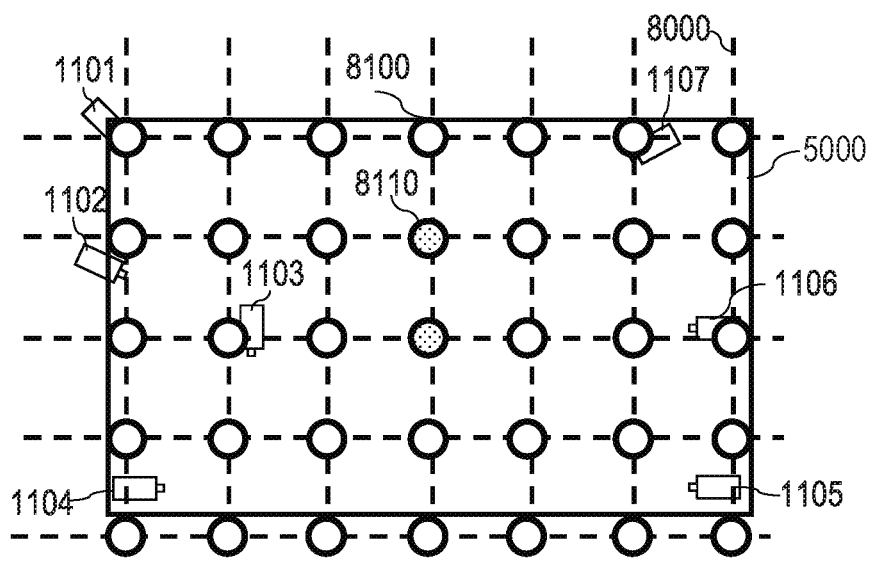
FIGS. 15A, 15B and 15C illustrate selection candidates for determining the arrangement positions of the microphones.
Figure 15B:
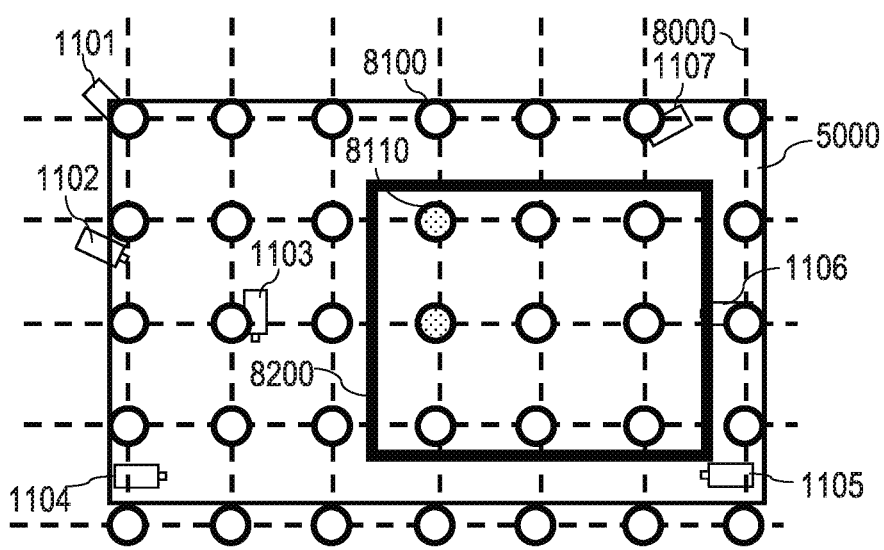
Figure 15C:
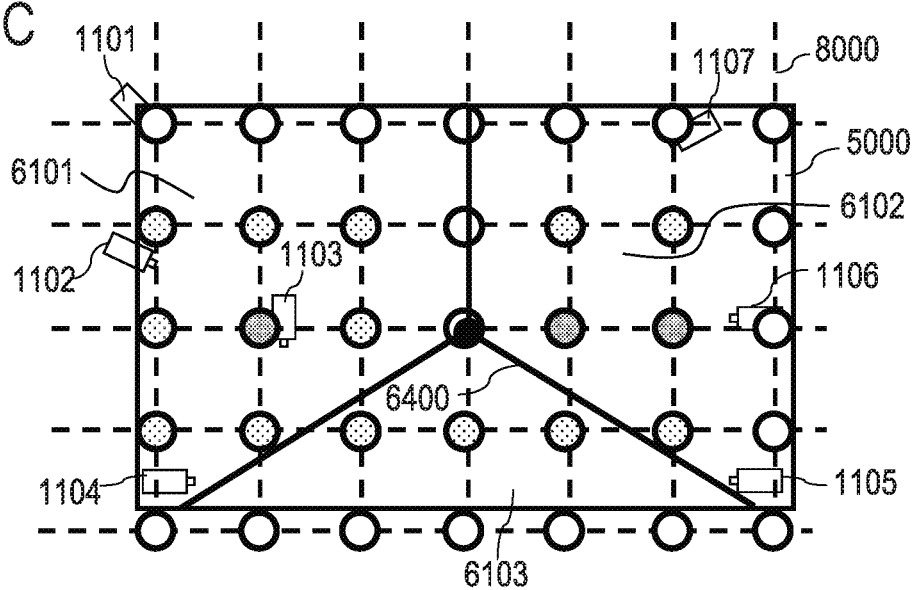

FIGS. 15A to 15C are explanatory drawings illustrating a method of determining the arrangement positions of the microphones. When the number of microphones is determined, the server device 3000 displays the selectable candidates of the arrangement positions of the microphones. First, the system controlling unit 3002 generates a grid 8000 for the room 5000 and displays round figures at the intersection points of the grid 8000 as the selectable candidates of the arrangement positions of the microphones. The system controlling unit 3002 then displays the densities of the circles at the intersection points of the grid 8000 according to distances between the capturing ranges 1201 to 1207 of the cameras 1101 to 1107 and the intersection points of the grid 8000 as in the method of determining the densities in FIG. 14.

FIG. 15A will be first described below. A circle 8100 at the intersection point of the grid 8000 is displayed with a low density because a distance from the circle 8100 to one of the capturing ranges 1201 to 1207 of the cameras 1101 to 1107 is larger than a first threshold value. A circle 8110 at the intersection point of the grid 8000 is displayed with a high density because a distance from the circle 8110 to one of the capturing ranges 1201 to 1207 of the cameras 1101 to 1107 is smaller than the first threshold value. The system controlling unit 3002 displays circles (figures) indicating the microphones at the intersection points of the grid 8000 on the displaying unit 3004, in forms determined by distances between the intersection points of the grid 8000 and the capturing ranges 1201 to 1207 of the cameras 1101 to 1107.

FIG. 15B will be described below. First, the system controlling unit 3002 sets an arrangement region 8200 of the microphones in response to a user instruction and displays the arrangement region 8200. The system controlling unit 3002 then displays only circles with determined densities at the intersection points of the grid 8000 inside the arrangement region 8200 as in the method of FIG. 15A. The system controlling unit 3002 displays circles at the intersection points of the grid 8000 in the arrangement region 8200 on the displaying unit 3004, in forms determined by distances between the intersection points of the grid 8000 in the arrangement region 8200 and the capturing ranges 1201 to 1207 of the cameras 1101 to 1107. In the arrangement region 8200, processing for densities is necessary for the circles at the intersection points of the grid 8000, whereas outside the arrangement region 8200, the processing for densities is not necessary for the circles at the intersection points of the grid 8000. This reduces the processing time of the system controlling unit 3002, improving user operability.

FIG. 15C will be described below. First, the system controlling unit 3002 divides the room 5000 into three regions 6101 to 6103 according to the method described in FIG. 12. The system controlling unit 3002 then displays the densities of the circles at the intersection points of the grid 8000 according to distances between the capturing ranges of the cameras and the intersection points of the grid 8000 in the region 6101 according to the method described in FIG. 15A. Moreover, the system controlling unit 3002 displays the densities of the circles at the intersection points of the grid 8000 according to distances between the capturing ranges of the cameras and the intersection points of the grid 8000 in the region 6102 according to the method described in FIG. 15A. Furthermore, the system controlling unit 3002 displays the densities of the circles at the intersection points of the grid 8000 according to distances between the capturing ranges of the cameras and the intersection points of the grid 8000 in the region 6103 according to the method described in FIG. 15A. The system controlling unit 3002 displays the circles at the intersection points of the grid 8000 for each of the three regions 6101 to 6103 on the displaying unit 3004, in forms determined by distances between the intersection points of the grid 8000 and the capturing ranges of the cameras. On the straight line 6400, the system controlling unit 3002 does not determine densities at the intersection points of the grid 8000 but can place the microphones at the positions of the intersection points.

As described above, the system controlling unit 3002 displays the densities of circles at the intersection points of the grid 8000 according to the method described in FIGS. 15A, 15B and 15C. A user can properly select the arrangement positions of the microphones from the intersection points of the grid 8000 with reference to the densities of the circles at the intersection points of the grid 8000. The system controlling unit 3002 determines the arrangement positions of the microphones in response to a user instruction.

Figure 16A:
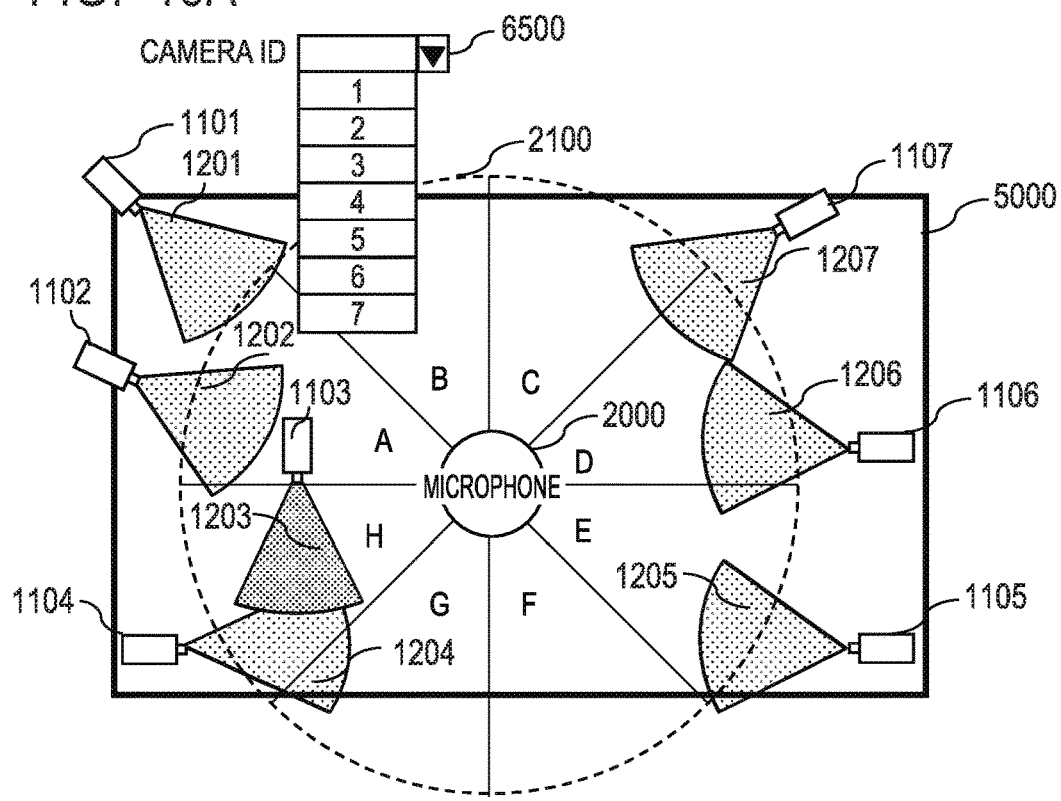
FIGS. 16A and 16B illustrate the selection of a camera ID and a sound collecting direction.
Figure 16B:
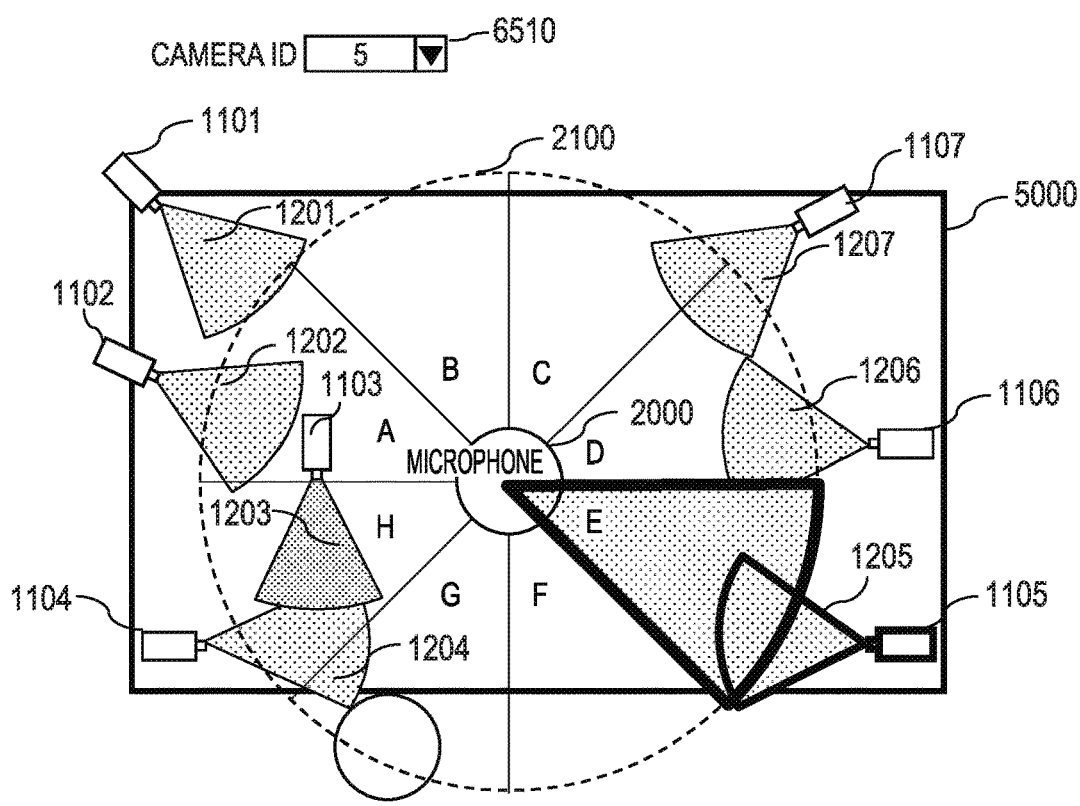

FIGS. 16A and 16B are explanatory drawings illustrating a method of selecting a camera ID and displaying a sound collecting direction in order to confirm the sound collecting directions of the microphone 2000 for the cameras 1101 to 1107. The system controlling unit 3002 determines the arrangement of the single microphone 2000 according to the method described in FIGS. 15A and 15B. A collecting range 2100 of the microphone 2000 is set with respect to the position of the microphone 2000 and is divided into eight collecting ranges A to H of directivity. The system controlling unit 3002 sets the collecting ranges A to H, in which the capturing ranges 1201 to 1207 of the cameras 1101 to 1107 at least partially overlap each other, as the collecting ranges of directivity for the cameras 1101 to 1107. For example, the system controlling unit 3002 sets the collecting range E that at least partially overlaps the capturing range 1205 of the camera 1105, as the collecting range of directivity for the camera 1105. The system controlling unit 3002 sets the collecting range for each of the cameras 1101 to 1107, from among the collecting ranges A to H of directivity of the microphone 2000.

First, as illustrated in FIG. 16A, the system controlling unit 3002 selects a camera ID from the pull-down list 6500 in response to a user instruction. The camera ID is a number selected from 1 to 7 for identifying the cameras 1101 to 1107. The camera ID may be a character string instead of a number. For example, when the system controlling unit 3002 selects the camera ID "5" from the pull-down list 6500 in response to a user instruction, as illustrated in FIG. 16B, the camera ID "5" is displayed in a camera ID display region 6510. In this case, the camera ID "5" is the camera ID of the camera 1105. For each of the cameras 1101 to 1107, at least one of the collecting ranges A to H is set as a collecting range of directivity. For example, for the camera 1105, the collecting range E of the microphone 2000 is set as a collecting range of directivity. Subsequently, the system controlling unit 3002 highlights the camera 1105 corresponding to the selected camera ID "5", the capturing range 1205 of the camera 1105, and the collecting range E set for the camera 1105. The system controlling unit 3002 displays the set ranges A to H of directivity for the respective cameras 1101 to 1107 on the displaying unit 3004.

Figure 17:
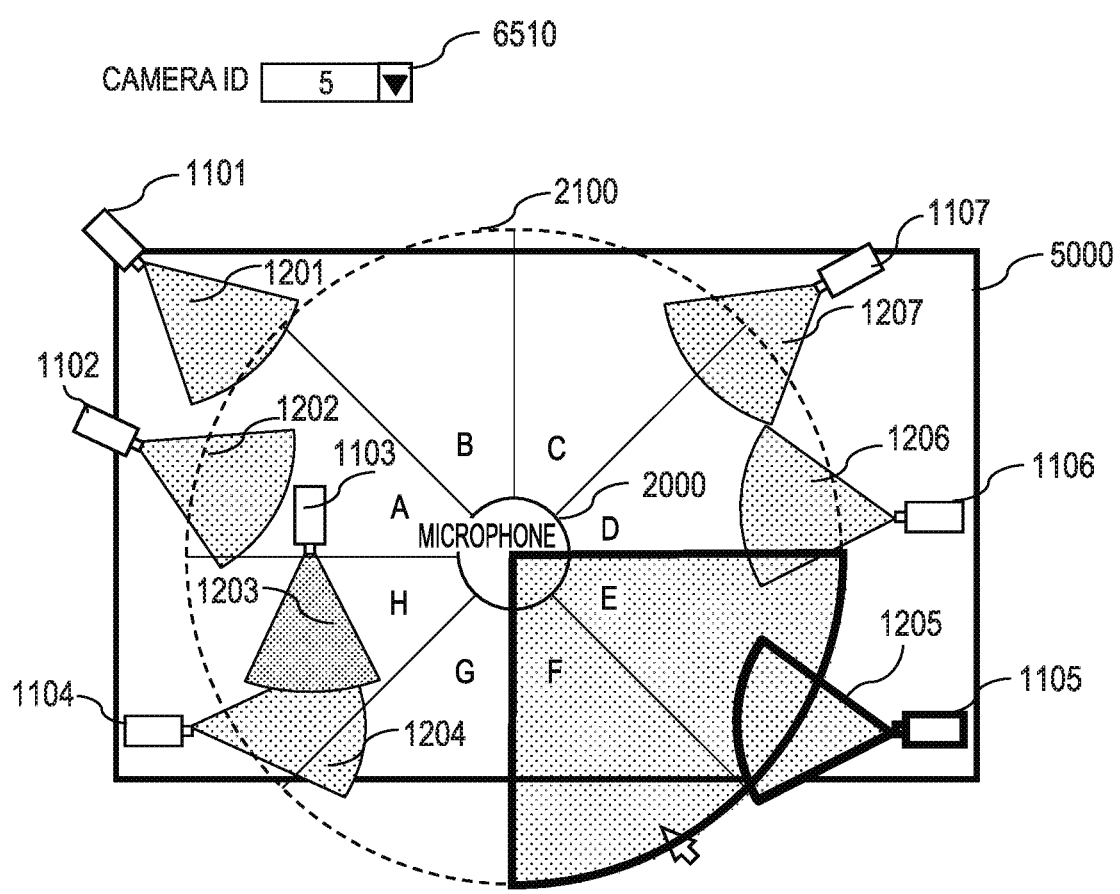
FIG. 17 illustrates that the directivity conditions of the microphone are changed.

FIG. 17 is an explanatory drawing illustrating a method of changing the collecting range of the directivity of the microphone for the selected camera ID. In FIG. 16B, if a user intends to change the collecting range of the directivity of the camera 1105 for the camera ID "5" from the collecting range E to the collecting ranges E and F, the region of the collecting range F is clicked or tapped with the input unit 3005. When the region of the collecting range F is clicked or tapped, the system controlling unit 3002 highlights and displays the collecting range F as illustrated in FIG. 17. The system controlling unit 3002 then changes the collecting range of the directivity of the camera 1105 for the camera ID "5" from the collecting range E to the collecting ranges E and F.

As described above, the user clicks or taps the collecting ranges A to H to be added other than the collecting range E. Thus, the system controlling unit 3002 adds the clicked or tapped collecting range as a collecting range of directivity of the camera 1105. The user can also click or tap the region of the collecting range to be deleted from among the collecting ranges of directivity set for the camera 1105. Thus, the system controlling unit 3002 deletes the clicked or tapped collecting range from the collecting ranges of directivity of the camera 1105. As described above, in response to a user instruction from the input unit 3005, the system controlling unit 3002 adds or deletes the set collecting range of directivity for each of the cameras 1101 to 1107. According to the method, the user can set the collecting ranges of directivity of the cameras 1101 to 1107.

Figure 18:
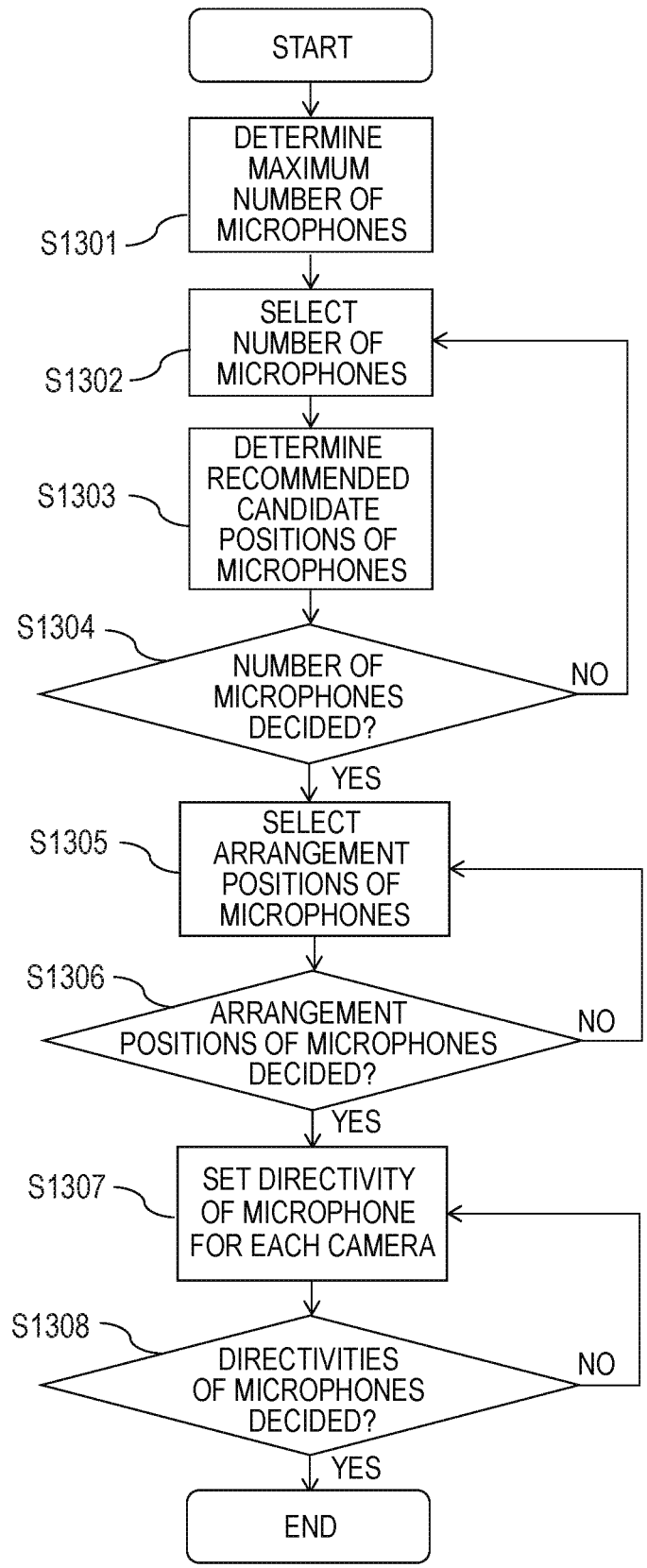
FIG. 18 is a flowchart for setting the arrangement of the microphone and the directivity conditions.

FIG. 18 is a flowchart of a method of controlling the server device 3000. A user can set the arrangement of the microphone and the collecting ranges of directivity. A method of setting the arrangement of the microphone and the collecting range of directivity by the server device 3000 will be described below.

In S1301, according to the method described in FIG. 11, the system controlling unit 3002 determines the maximum number of arranged microphones in the room according to the dimensions of the room and the dimensions of the collecting range of the microphone.

Subsequently, in S1302, the system controlling unit 3002 displays options about the number of microphones up to the maximum number of microphones in S1301 as the pull-down list 6000 of FIG. 12 on the displaying unit 3004. The system controlling unit 3002 then selects the number of microphones, at most the maximum number of microphones, selected and instructed from the options of the pull-down list 6000 in response to a user instruction of selection from the input unit 3005.

Subsequently, in S1303, the system controlling unit 3002 determines recommended candidate positions for the selected number of microphones according to the method described in FIG. 12. As illustrated in FIGS. 13A and 13B, the system controlling unit 3002 arranges the microphones at the recommended candidate positions of the microphones and displays the arrangement of the selected number of microphones, the arrangement of the cameras and the capturing ranges of the cameras on the displaying unit 3004.

Subsequently, in S1304, the user confirms or changes the number of microphones with reference to the arrangement of the microphones in one of FIGS. 13A and 13B. In the case of a user instruction to confirm the number of microphones, the system controlling unit 3002 advances to S1305. In the case of a user instruction to change the number of microphones, the system controlling unit 3002 returns the processing to S1302. The system controlling unit 3002 repeats the processing until the number of microphones is confirmed.

In S1305, the system controlling unit 3002 generates the grid 8000 as illustrated in FIGS. 15A to 15C after the instruction to confirm the number of microphones. The system controlling unit 3002 then displays circles (figures) indicating the microphones at the intersection points of the grid 8000 on the displaying unit 3004, the circles having densities according to distances between the intersection points of the grid 8000 and the capturing ranges of the cameras. The user can select the arrangement position of the microphone from among the intersection points of the grid 8000 based on the display of FIGS. 15A to 15C. The system controlling unit 3002 selects one of the intersection points of the grid 8000 as the arrangement position of the microphone in response to a user instruction from the input unit 3005.

Subsequently, in S1306, the user confirms or changes the arrangement position of the microphone based on the display of FIGS. 15A to 15C. In the case of a user instruction to confirm the arrangement position of the microphone, the system controlling unit 3002 advances the processing to S1307. In the case of a user instruction to change the arrangement position of the microphone, the system controlling unit 3002 returns the processing to S1305.

In S1307, as illustrated in FIGS. 16A and 16B, the system controlling unit 3002 sets one of the collecting ranges A to H of the directivity of the microphone 2000 for each of the cameras 1101 to 1107 according to the method. The system controlling unit 3002 then selects the camera ID in response to a user operation from the input unit 3005 as illustrated in FIG. 16A. Thereafter, as illustrated in FIG. 16B, the system controlling unit 3002 highlights and displays, on the displaying unit 3004, the collecting range of the directivity of the microphone, the collecting range being set for the camera corresponding to the selected camera ID. As illustrated in FIG. 17, in response to a user operation from the input unit 3005, the system controlling unit 3002 can add or delete the collecting range of the directivity of the microphone set for the camera corresponding to the selected camera ID.

Subsequently, in 51308, the user provides an instruction about whether to confirm the collecting ranges of the directivity of the microphone based on the display of one of FIGS. 16B and 17, the collecting ranges being set for all the cameras. In the case of a user instruction to confirm the collecting range of directivity, the system controlling unit 3002 terminates the processing of FIG. 18. In the case of a user instruction to change the collecting range of directivity, the system controlling unit 3002 returns the processing to S1307.

According to the present embodiment, a user unfamiliar with the characteristics of the microphone can also determine a suitable arrangement of the cameras and the microphone. Thus, the video audio processing system 100 can generate audio according to the video of the camera.

Other Embodiments

The present invention can be also achieved by processing in which a program for implementing at least one function of the embodiments is supplied to a system or an apparatus via a network or a storage medium and the program is read and executed by at least one processor in the computer of the system or the apparatus. Alternatively, the present invention can be achieved by a circuit (e.g., an ASIC) for implementing at least one function.

The embodiments are merely specific examples for implementing the present invention and should not limit the interpretation of the technical scope of the present invention. In other words, the present invention can be implemented in various ways without departing from the technical idea or the main characteristics.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167901, filed Sep. 7, 2018, and Japanese Patent Application No. 2018-167783, filed Sep. 7, 2018, which are hereby incorporated by reference herein in their entirety.

What is claimed is:

1. A video audio processing system comprising:
   a plurality of network cameras configured to generate video data, the network cameras having IP addresses allocated thereto;
   a plurality of communication devices that transmit audio data collected by microphones, the communication devices having IP addresses allocated thereto; and
   a server that generates a video file associated with the audio data, the server comprising:
      at least one memory storing instructions; and
      at least one processor that executes the stored instructions to perform the functions of
         a holding unit configured to hold a table for associating the IP addresses of the network cameras out of the plurality of network cameras with the IP address of at least one of the communication devices; and
         an associating unit configured to generate a file by associating, in a case where video transmitted from one of the plurality of network cameras is obtained, video data transmitted from the network camera with the audio data transmitted from the microphone having an IP address corresponding to the IP address transmitted from the network camera, the video data and the audio data being associated with each other with reference to the table,
      wherein the at least one processor further performs the functions of a display unit configured to display options of the number of microphones on a display and an arrangement of the selected and instructed number of microphones and the plurality of network cameras from the options, and
      wherein the display unit is configured to, based on the N selected microphones, generate a regular N polygon such that one of a center of gravity, an incenter and a circumcenter of a region where the plurality of network cameras are arranged is aligned with a center of gravity, an incenter and a circumcenter of the regular N polygon, to generate N straight lines passing through vertexes of the regular N polygon from one of the center of gravity, the incenter and the circumcenter of the regular N polygon, and to arrange the microphone at one of the center of gravity, the incenter and the circumcenter of each of N regions divided by the N straight lines from the region where the plurality of network cameras are arranged, the microphone being displayed on the display.

2. The video audio processing system according to claim 1, wherein the at least one processor further performs the functions of a generating unit configured to generate the table by calculating capturing ranges of the plurality of network cameras and associating the calculated capturing range with audio data from a collecting range corresponding to the capturing range.

3. The video audio processing system according to claim 2, wherein the generating unit is configured to calculate the capturing ranges of the plurality of network cameras based on positions, capturing directions, capturing angles and capturing distances of the plurality of network cameras.

4. The video audio processing system according to claim 1, wherein the at least one processor further performs the functions of a determining unit configured to determine a maximum number of audio input devices arranged in a region where the plurality of network cameras are arranged, according to dimensions of the region where the plurality of network cameras are arranged and dimensions of a capturing range of the audio input device.

5. The video audio processing system according to claim 1, wherein, in the server, the display unit is configured to determine display formats of capturing ranges of the plurality of network cameras according to distances between the capturing ranges of the plurality of network cameras and the microphone.

6. The video audio processing system according to claim 1, wherein the display unit is configured to display, in response to an instruction on the number of microphones, a grid in a region where the plurality of network cameras are arranged, and to display figures indicating the microphones at intersection points of the grid in forms determined by distances between the intersection points of the grid and the capturing ranges of the network cameras, the figures being displayed on the displaying unit.

7. The video audio processing system according to claim 1, wherein the at least one processor further performs the functions of a setting unit configured to set, for each of the plurality of network cameras, at least one of ranges divided from a collecting range of the microphone, wherein the display unit is configured to display the set range for each of the plurality of network cameras, the range being displayed on the displaying unit.

* * * * *